US006771268B1

(12) United States Patent
Crinon

(10) Patent No.: US 6,771,268 B1
(45) Date of Patent: Aug. 3, 2004

(54) VIDEO SKIMMING SYSTEM UTILIZING THE VECTOR RANK FILTER

(75) Inventor: Regis J. Crinon, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/518,610

(22) Filed: Mar. 3, 2000

Related U.S. Application Data

(63) Continuation-in-part of application No. 09/287,390, filed on Apr. 6, 1999, now Pat. No. 6,331,859.

(51) Int. Cl.[7] .............................................. G06T 15/00
(52) U.S. Cl. ..................................................... 345/475
(58) Field of Search ................................. 345/418, 419, 345/475, 619, 620, 625, 716, 723, 730; 382/225; 704/251; 386/46, 68, 69, 70

(56) References Cited

U.S. PATENT DOCUMENTS

| | | | |
|---|---|---|---|
| 5,233,681 A | * 8/1993 | Bahl et al. ................... 704/251 |
| D348,251 S | 6/1994 | Hendricks | |
| D354,059 S | 1/1995 | Hendricks | |
| 5,434,678 A | 7/1995 | Abecassis ..................... 386/52 |
| D368,263 S | 3/1996 | Hendricks | |
| 5,559,549 A | 9/1996 | Hendricks et al. | |
| 5,589,945 A | 12/1996 | Abecassis ..................... 386/83 |
| 5,600,364 A | 2/1997 | Hendricks et al. | |
| 5,600,573 A | 2/1997 | Hendricks et al. | |
| 5,610,653 A | 3/1997 | Abecassis .................... 348/170 |
| 5,634,849 A | 6/1997 | Abecassis ..................... 463/30 |
| 5,635,982 A | 6/1997 | Zhang et al. ........... 348/231.99 |
| D381,991 S | 8/1997 | Hendricks | |
| 5,659,350 A | 8/1997 | Hendricks et al. | |
| 5,664,046 A | 9/1997 | Abecassis .................... 386/125 |
| 5,664,227 A | 9/1997 | Mauldin et al. ............ 715/516 |
| 5,682,195 A | 10/1997 | Hendricks et al. | |

(List continued on next page.)

FOREIGN PATENT DOCUMENTS

| | | |
|---|---|---|
| JP | 11-032267 | 2/1999 |
| JP | 11-261908 | 9/1999 |
| JP | 2000-013755 | 1/2000 |
| WO | WO 99/65237 | 12/1999 |

OTHER PUBLICATIONS

Langendijk et al., Visual Search in a Smash System, Proceedings of International Conference on Image Processing, pp. 671–674, IEEE 1996.
Smith et al., "Video Skimming and Characterization Through the Combination of Image and Language Undrestanding Technique" CMU Technical Report CMU–CS–97–111, Carnegie Mellon University, 1997.
Astola et al., "Vector Median Filters" Proceedings of IEEE, vol. 78, No. 4, Apr. 1990, pp. 678–689.

*Primary Examiner*—Phu K. Nguyen
(74) *Attorney, Agent, or Firm*—Chernoff, Vilhauer, McClung & Stenzel, LLP

(57) ABSTRACT

Automated summarization of digital video sequences is accomplished using a vector rank filter. The consecutive frames of a digital video sequence can be represented as feature vectors which are successively accumulated in a set of vectors. The distortion of the set by the addition of each successive vector or the cumulative distance from each successive vector to all other vectors in the set is determined by a vector rank filter. When the distortion exceeds a threshold value the end of a video segment is detected. Each frame in a video segment can be ranked according to its relative similarity to the other frames of the set by applying the vector rank filter to the feature vectors representing the video frames. To produce a summary of a video sequence which is most representative of the content of the sequence, frames are chosen that correspond to vectors that are the least distant to or produce the least distortion of the set of vectors representing the segment. The ranking of the relative distortion can be used as the basis for selecting more than one frame from each segment to produce a hierarchy of summaries containing greater numbers of the frames having the most representative content.

11 Claims, 18 Drawing Sheets

U.S. PATENT DOCUMENTS

| | | | | |
|---|---|---|---|---|
| 5,684,918 | A | 11/1997 | Abecassis | 386/83 |
| 5,696,869 | A | 12/1997 | Abecassis | 386/52 |
| 5,710,884 | A | 1/1998 | Dedrick | 709/217 |
| 5,717,814 | A | 2/1998 | Abecassis | 386/46 |
| 5,724,472 | A | 3/1998 | Abecassis | 386/52 |
| 5,734,853 | A | 3/1998 | Hendricks et al. | |
| 5,761,881 | A | 6/1998 | Wall | 53/415 |
| 5,774,357 | A | 6/1998 | Hoffberg et al. | |
| 5,797,001 | A | 8/1998 | Augenbraun et al. | 707/9 |
| 5,798,785 | A | 8/1998 | Hendricks et al. | |
| D402,310 | S | 12/1998 | Hendricks | |
| 5,867,386 | A | 2/1999 | Hoffberg et al. | |
| 5,875,108 | A | 2/1999 | Hoffberg et al. | |
| 5,892,536 | A | 4/1999 | Logan et al. | 725/34 |
| 5,900,867 | A | 5/1999 | Schindler et al. | 345/719 |
| 5,901,246 | A | 5/1999 | Hoffberg et al. | |
| 5,903,454 | A | 5/1999 | Hoffberg et al. | |
| 5,913,013 | A | 6/1999 | Abecassis | 386/125 |
| 5,920,477 | A | 7/1999 | Hoffberg et al. | |
| 5,926,624 | A | 7/1999 | Katz et al. | 709/217 |
| 5,958,006 | A | 9/1999 | Eggleston et al. | 725/35 |
| 5,973,683 | A | 10/1999 | Cragun et al. | 709/217 |
| 5,986,690 | A | 11/1999 | Hendricks | |
| 5,986,692 | A | 11/1999 | Logan et al. | 725/35 |
| 5,987,211 | A | 11/1999 | Abecassis | 386/46 |
| 5,990,927 | A | 11/1999 | Hendricks et al. | |
| 5,995,095 | A | * 11/1999 | Ratakonda | 382/225 |
| 6,002,833 | A | 12/1999 | Abecassis | 386/70 |
| 6,011,895 | A | 1/2000 | Abecassis | 386/69 |
| 6,038,367 | A | 3/2000 | Abecassis | 386/46 |
| 6,052,554 | A | 4/2000 | Hendricks et al. | |
| 6,067,401 | A | 5/2000 | Abecassis | 386/125 |
| 6,072,934 | A | 6/2000 | Abecassis | 386/46 |
| 6,081,750 | A | 6/2000 | Hoffberg et al. | |
| 6,088,455 | A | 7/2000 | Logan et al. | 380/200 |
| 6,091,886 | A | 7/2000 | Abecassis | 386/125 |
| RE36,801 | E | 8/2000 | Logan et al. | 348/571 |
| 6,151,444 | A | 11/2000 | Abecassis | 386/125 |
| D435,561 | S | 12/2000 | Pettigrew et al. | D14/487 |
| 6,160,989 | A | 12/2000 | Hendricks et al. | |
| 6,181,335 | B1 | 1/2001 | Hendricks et al. | |
| 6,201,536 | B1 | 3/2001 | Hendricks et al. | |
| 6,208,805 | B1 | 3/2001 | Abecassis | 386/126 |
| 6,215,526 | B1 | 4/2001 | Barton et al. | 348/473 |
| 6,230,501 | B1 | 5/2001 | Bailey, Sr. et al. | |
| 6,233,389 | B1 | 5/2001 | Barton et al. | 386/46 |
| 6,252,544 | B1 | 6/2001 | Hoffberg | |
| 6,269,216 | B1 | 7/2001 | Abecassis | 386/46 |
| 6,289,165 | B1 | 9/2001 | Abecassis | 386/46 |
| 6,304,715 | B1 | 10/2001 | Abecassis | 386/68 |
| 6,331,859 | B1 | * 12/2001 | Crinon | 345/619 |
| 6,342,904 | B1 | * 1/2002 | Vasudevan et al. | 345/723 |

* cited by examiner

VIDEO SKIMMING SYSTEM UTILIZING THE VECTOR RANK FILTER

CROSS-REFERENCE TO RELATED APPLICATIONS

This is a continuation-in-part of application Ser. No. 09/287,390, filed Apr. 6, 1999, now U.S. Pat. No. 6,331,859 B1.

BACKGROUND OF THE INVENTION

The present invention relates to digital video content analysis and more particularly to a system for summarizing digital video sequences as a series of representative key frames.

The increasing availability and use of video have created a need for video summaries and abstractions to aid users in effective and efficient browsing of potentially thousands of hours of video. Automation of video content analysis and extraction of key representative content to create summaries has increased in significance as video has evolved from an analog to a digital format. Digital television, digital video libraries, and the Internet are applications where an appliance that can "view" the video and automatically summarize its content might be useful.

Generally, a sequence of video includes a series of scenes. Each scene, in turn, includes a series of adjoining video "shots" or segments. A shot or segment is a relatively homogeneous series of individual frames produced by a single camera focusing on an object or objects of interest belonging to the same scene. Generally, automated video content analysis and extraction involve "viewing" the video sequence, dividing the sequence into a series of shots, and selecting one or more "key frames" from each of the shots to represent the content of the shot. A summary of the video sequence results when the series of key frames is displayed. The summary of the video will best represent the video sequence if the frames which are most representative of the content of each shot are selected as key frames for inclusion in the summary. Creation of a hierarchy of summaries, including a greater or lesser number of key frames from each shot, is also desirable to satisfy the differing needs of users of the video.

The first step in the summarization process has been the division of the video into a series of shots or segments of relatively homogeneous content. Video shot transitions can be characterized by anything from abrupt transitions occurring between two consecutive frames (cuts) to more gradual transitions, such as "fades," "dissolves," and "wipes." One technique for detecting the boundaries of a shot involves counting either the number of pixels or the number of predefined areas of an image that change in value by more than a predefined threshold in a subsequent frame. When either the total number of pixels or areas satisfying this first criterion exceeds a second predefined threshold a shot boundary is declared. Statistical measures of the values of pixels in pre-specified areas of the frame have also been utilized for shot boundary detection. Pixel difference techniques can be sensitive to camera and object motion. Statistical techniques tend to be relatively slow due to the complexity of computing the statistical formulas.

Histograms and histogram related statistics are the most common image representations used in shot boundary detection. Gray level histograms, color histograms, or histogram related statistics can be compared for successive frames. If the difference exceeds a predefined threshold, a shot boundary is detected. A second threshold test may also be included to detect the more gradual forms of shot transition.

Selecting one or more key frames which best represent the relatively homogeneous frames of a shot has been more problematic than defining shot boundaries. Lagendijk et al. in a paper entitled VISUAL SEARCH IN A SMASH SYSTEM, Proceedings of the International Conference on Image Processing, pages 671–674, 1996, describe a process in which shot boundaries are determined by monitoring cumulative image histogram differences over time. The frames of each shot are temporally divided into groups reflecting the pre-specified number of key frames to be extracted from each shot. The frame at the middle of each group of frames is then selected as the key frame for that group. The selection of a key frame is arbitrary and may not represent the most "important" or "meaningful" frame of the group. Also, this process must be performed "off-line" with storage of the entire video for "review" and establishment of shot boundaries, followed by temporal segmentation of shots and then extraction of key frames. For key frame extraction, the stored video must be loaded into a processing buffer so that the group of frames and associated key frames can be calculated. The size of a shot is limited by the size of the processing buffer.

In the copending application of Ratakonda, Ser. No. 08/994,558, filed Dec. 19, 1997, shot boundaries are determined by monitoring variations in the differences in image histograms over time. Individual shots are further partitioned into segments which represent highly homogeneous groups of frames. The partitioning of shots into segments is achieved through an iterative optimization process. For each video segment, the frame differing most from the key frame of the prior segment is selected as the next key frame of the summary. A key frame is selected on the basis of the frame's difference from the prior key frame and not on the basis of its representation of the other frames belonging to the segment. Like the technique proposed by Lagendijk, this technique must be performed off-line and an entire video shot must be stored for review, segment partitioning, and key frame selection. Additional memory is required to store the prior key frame for comparison.

Zhang et al., U.S. Pat. No. 5,635,982, disclose a method in which the difference between frames is monitored and accumulated. When the accumulated difference exceeds a predefined threshold, a potential key frame is detected. The potential key frame is designated as a key frame if, in addition, the difference between the potential key frame and the previous key frame exceeds a preset threshold. Without additional processing, the locations of key frames always coincide with the beginning a new shot.

Smith et al., in a paper entitled VIDEO SKIMMING AND CHARACTERIZATION THROUGH THE COMBINATION OF IMAGE AND LANGUAGE UNDERSTANDING TECHNIQUES and Mauldin et al., U.S. Pat. No. 5,664,227 disclose an elaborate key frame identification technique based on context rules related to repetitiveness, degrees of motion, and audio and video content. The key frame sequences can be used to provide compact summaries of video sequences but the method is complex and does not support creation of hierarchical video summaries.

What is desired is a technique of automated video content analysis and key frame extraction which selects key frames that are the most representative frames of each shot or segment of the video sequence. Simple implementation, conservation of computational resources, and the ability to accept a variety of inputs are desirable characteristics of such a technique. It is desired that the technique provide for content analysis and key frame extraction both "on-line (in real time)," without the need to store the entire video sequence, and "off-line." Further, a technique of conveniently creating a hierarchy of summaries, each successively containing a smaller number of the most representative frames, is desired.

SUMMARY OF THE INVENTION

The present invention overcomes the aforementioned drawbacks of the prior art by providing a method and apparatus for digital video content analysis and extraction based on analysis of feature vectors corresponding to the frames of a video sequence. In the first embodiment of the invention, a method is provided for identifying a key video frame within a segment of video having frames of relatively homogeneous content including the steps of characterizing each video frame as a feature vector; identifying a key feature vector that minimizes the distortion of the group of feature vectors; and identifying the video frame corresponding to the key feature vector as the key video frame. Key frames selected by the method of this first embodiment of the present invention are the frames which are the most representative of the content of the set of frames in each shot of a sequence.

In the second embodiment, a method is provided for determining a second boundary of a video segment within a video sequence comprising the steps of defining a threshold distortion; locating a first frame in the video segment; defining a first feature vector representative of the first frame; including the first feature vector in a set of segment feature vectors; defining a next feature vector representative of a subsequent video frame; including the next feature vector in the set of segment feature vectors; calculating the distortion of the set of segment feature vectors resulting from including the next feature vector in the set; and comparing the distortion of the set of segment feature vectors with the threshold distortion. The steps of characterizing subsequent frames as feature vectors, adding feature vectors to the set, calculating the distortion, and comparing the distortion with the threshold is repeated until the distortion of the set of segment feature vectors has achieved some predefined relationship to the threshold distortion thereby defining the second boundary of the segment. Prior receipt and storage of the entire video sequence are not required for the segmentation process. Key frames can be identified simultaneously with segmentation of the video by applying the methods of both the first or second embodiments.

In the third embodiment of the present invention a method is provided for creating summaries of video sequences including more than one key frame from each segment comprising the steps of dividing the video frames of the sequence into at least one video segment of relatively homogeneous content including at least one video frame; defining a feature vector representative of each of the video frames; ranking the feature vectors representing the frames included in each video segment according to the relative distortion produced in the set of feature vectors representing the segment by each feature vector included in the set; and including in the summary of the sequence, video frames represented by the feature vectors producing relative distortion of specified ranks. Utilizing the method of this third embodiment, a hierarchy of key frames can be identified from which hierarchical summaries of a video sequence can be created with each summary including a greater number of the most representative frames from each segment.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

Figure 1:
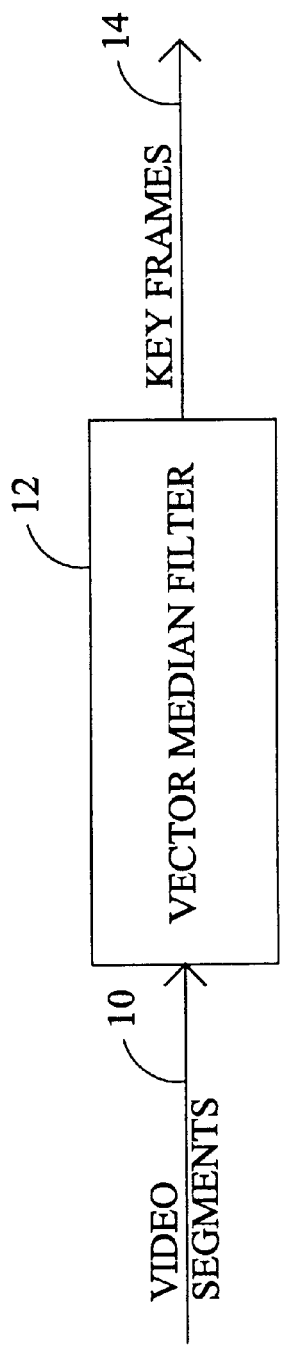
FIG. 1 illustrates the method of identifying key frames of the first embodiment of the present invention.
Figure 2A:
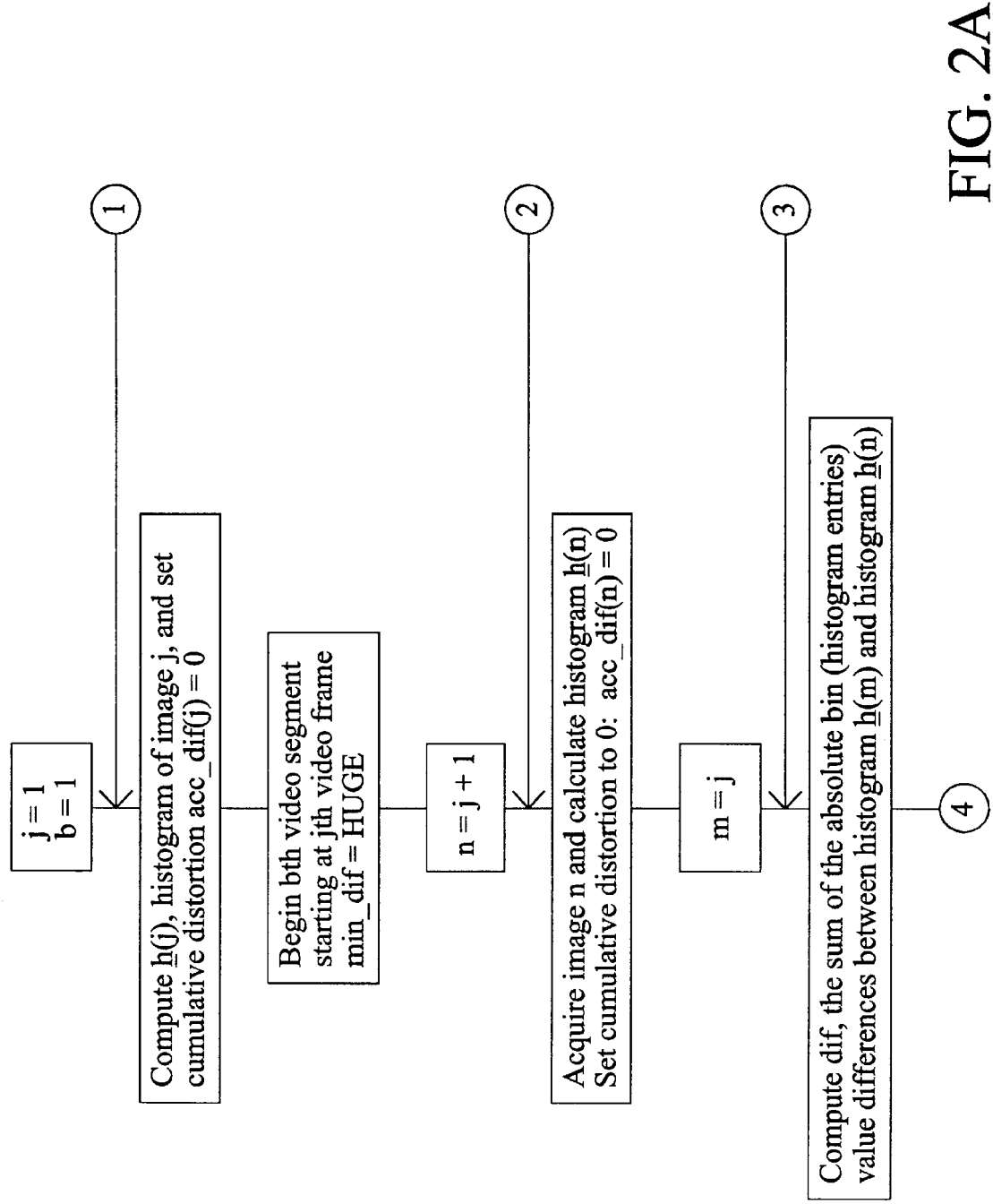
FIG. 2A is a flow chart illustrating one technique for performing the method of key frame identification of the first embodiment of the invention.
Figure 2B:
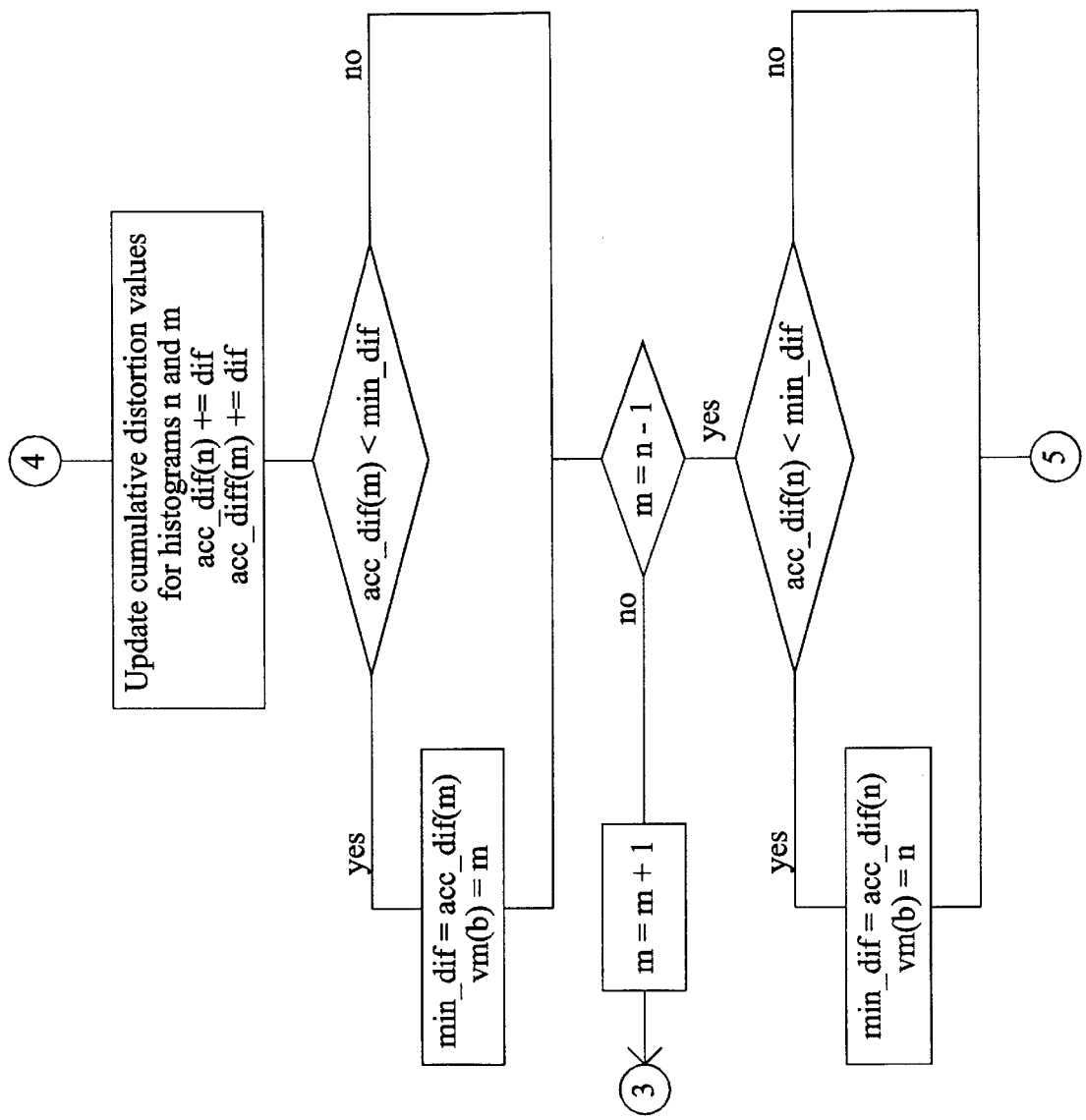
FIG. 2B is a continuation of the flow chart of FIG. 2A.
Figure 2C:
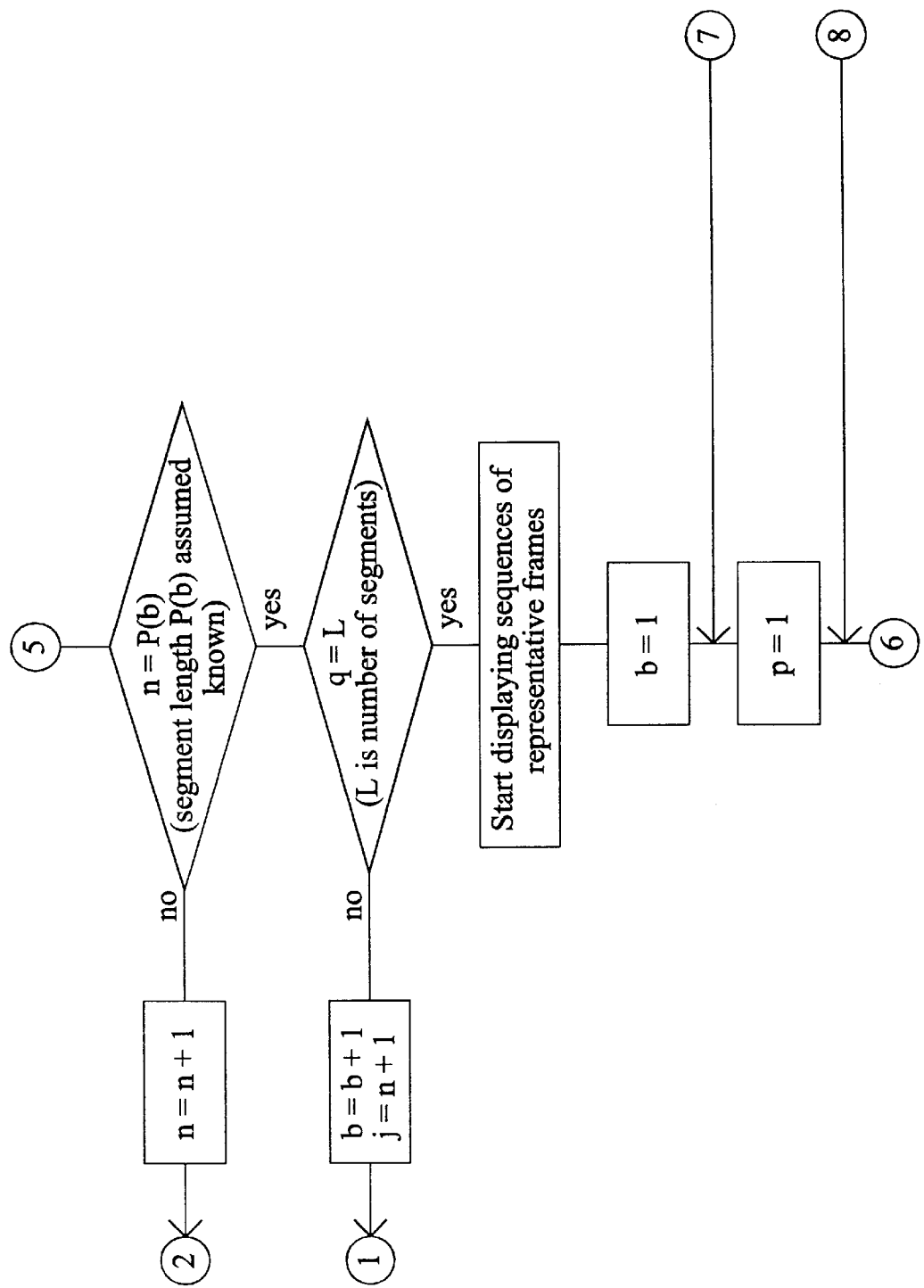
FIG. 2C is a continuation of the flow chart of FIG. 2B.
Figure 2D:
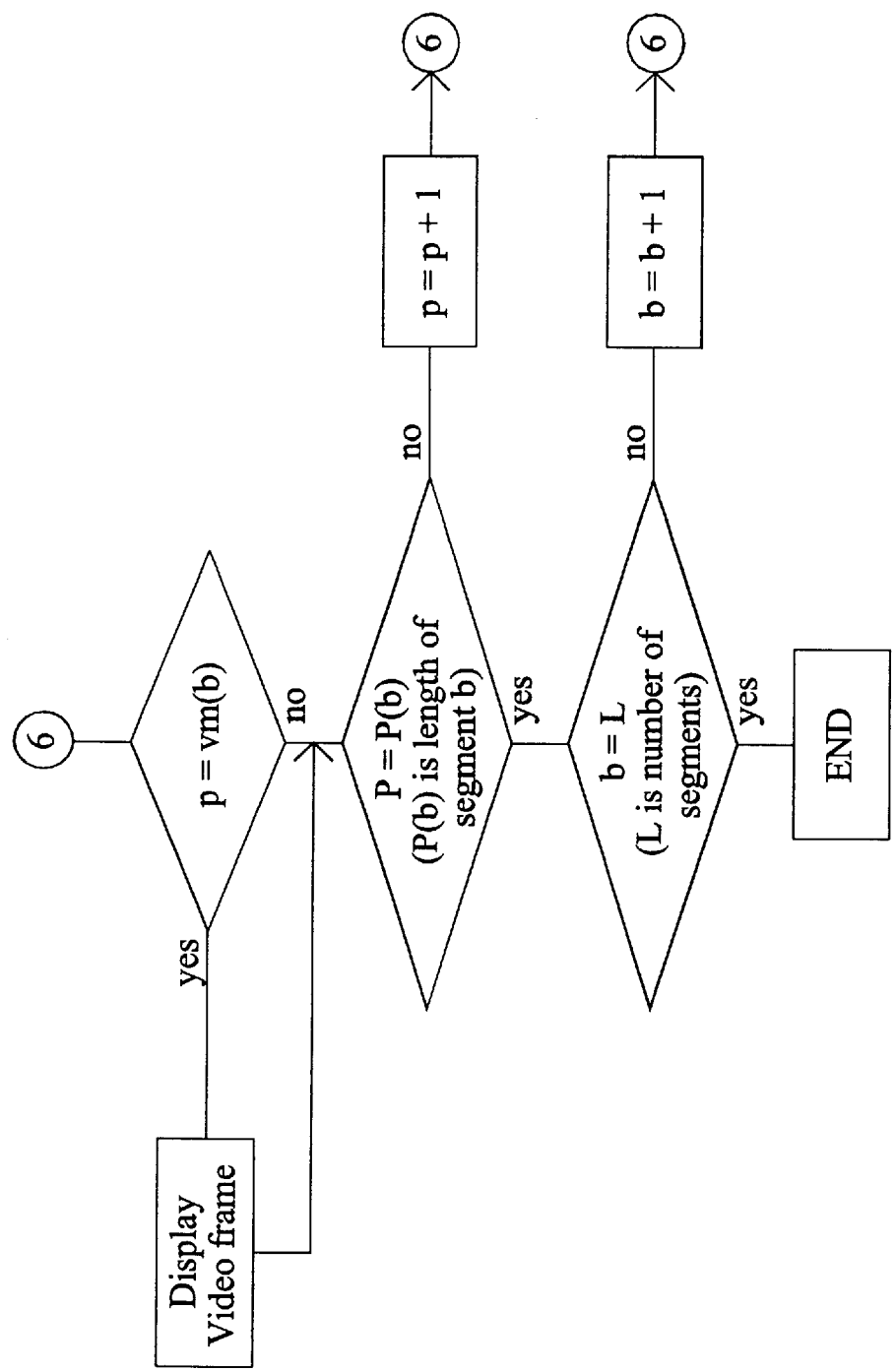
FIG. 2D is a continuation of the flow chart of FIG. 2C.

Generally, a video sequence includes a series of scenes. Each scene, in turn, includes a series of adjoining video segments or "shots." A shot is a relatively homogeneous series of consecutive individual frames produced by a single camera focusing on an object or objects of interest. Generally, automated video content analysis and extraction involve "viewing" the video sequence, dividing the sequence into a series of shots, and selecting of one or more "key frames" to represent the content of each of the shots. Displaying or providing a list of the key frames summarizes the video sequence.

The content of a frame of digital video can be represented in several ways. A common representation is an image histogram obtained by calculating the frequency distribution of picture elements or picture areas as a function of some property of the element or area. For example, a color histogram of an image is the frequency distribution of picture elements or areas as a function of the color of the element or area. The image histogram can, in turn, be represented as a vector signal including a combination of separate components each carrying information about a different property of the histogram, otherwise known as a "feature vector." Other image representations can also be captured by feature vectors. Feature vectors, for example, can be used to represent the average intensity of an image; an ordered set of image samples; an ordered, fixed set or subset of linear or nonlinear combinations of samples from an image; a luminance, chrominance, or combined luminance and chrominance sample value histogram; or an ordered set of statistical or deterministic, or a combination of statistical and deterministic, parameter values from an image or an image histogram.

In the present invention, the frames of a video sequence are preferably represented as multidimensional feature vectors. A vector rank filter or a more specialized version of the vector rank filter, the vector median filter, is used to determine the relative cumulative distances from each feature vector in a set to the other feature vectors in the set. The cumulative distance from a feature vector to all other feature vectors in the set measures the "distortion" of the set of vectors as evaluated from the vector under investigation. The distortion indicates the homogeneity of the content of a frame of video, characterized by the corresponding feature vector, with the content of all other frames of video in the set. The output of the vector rank filter is used to resolve the homogeneity of the video's content. The vector rank filter permits identification of the video frame that is most representative of the content of the frames of a set. It also facilitates determining when the content of a next frame in a series differs substantially from the preceding frames in the series or ranking the frames of a set according to the relative homogeneity of content of the frames or distortion of the set by each frame.

The vector rank filter can be used to rank the vectors of a set of vectors in terms of the cumulative distance from a vector to the other vectors of the set or the relative distortion of the set caused by each vector. Given a set of P vectors $x_h$, where $1 \leq h \leq P$, the output of the vector rank filter will be a vector, $x_{(h)}$, which has the hth smallest distortion value among the P distortion values. If $D_{(m)}^q$, where $1 \leq m \leq P$ and where q identifies the distance measure, is the distortion of rank m (ranked in increasing values of m) then $D_{(1)}^q$ corresponds to the minimum distortion, that is, distortion of rank one. Likewise, $D_{(2)}^q$ corresponds to the second smallest distortion. The distortion $D_{(P)}^q$ corresponds to the maximum distortion, and $D_{(h)}^q$ corresponds to the hth ranked smallest distortion. The vector characterized by the least cumulative distance is $x_1$, the vector characterized by the second smallest cumulative distance is $x_2$, and so forth. The vector characterized the greatest cumulative distance is $x_P$. For the vector $x_h$ the distortion equals:

$$D_{(h)}^q = \sum_{j=1}^{j=P} w_{j,(h)} \|x_j - x_{(h)}\|^q$$

where w is a weighting factor associated with the joint use of the vector $x_j$ and the vector $x_{(h)}$ and q specifies the distance or distortion measure. The choice of q may be determined by application considerations. For example, summing the absolute differences between the vectors (q=1) is computationally less intensive than summing the squares of the differences (q=2). In other applications, q might be selected to optimize the distortion with respect to certain input vector statistics. Likewise the weight $w_{j,(h)}$ might be selected to represent the relative importance of input feature vectors or to implement particular rank-ordered statistics.

In the case of ties in rank, the same rank may be allocated to all vectors sharing the same distortion value. In this case, the next rank used would be adjusted to reflect the fact that more than one vector occupies the "tied" rank. For example, if the distortions $D_i^q$, $D_j^q$, $D_m^q$ are equal and represent the second ranked distortion, the respective vectors $x_i$, $x_j$, and $x_m$ can all be assigned the rank of three (the average of the rank values: two, three and four). The vector producing the next smallest distortion would be assigned the rank five to reflect the fact that three vectors are sharing ranks two, three and four. An alternative approach to dealing with ties would be to assign a fractional rank to vectors sharing the same distortion. For example, if two vectors produce equal distortion, ranked two, the vectors might be assigned the rank 5/2 [(2+3)/2=5/2] to indicate the tie.

A specialized vector rank filter, the vector median filter, is particularly useful in identifying the most representative frame of a video segment or shot. The vector rank filter can also be used in determining the boundaries of a shot or segment. The output of the vector median filter identifies the vector producing the minimum distortion among all vectors in a set of vectors. In other words, the vector median filter identifies the vector of rank one as identified by the vector rank filter. Given a set of P vectors $x_j$, where $1 \leq j \leq P$, the output of the vector median filter, $x_k$, is such that the index k satisfies:

$$k = \underset{1 \leq i \leq P}{\mathrm{argmin}} \{D_i^q\}$$

where the distortion or cumulative distance $D_i^q$, for q=1, 2, ..., ∞ is defined as $$D_i^q = \sum_{j=1}^{j=P} w_{j,i} \|x_j - x_i\|^q$$

and where $w_{j,i}$ denotes a weighting factor applied when vector $x_j$ and vector $x_i$ are used jointly and q specifies the distortion or distance measure.

For example, if the vectors $x_i$ are R-dimensional vectors with components $x_{i,r}$, where $1 \leq i \leq R$, and if the weight value, $w_{i,j}$, and the distortion or distance measure q are equal to 1 the minimum distortion is:

$$D_i^1 = \sum_{j=1}^{j=P} \sum_{r=1}^{r=R} |x_{j,r} - x_{i,r}|^2$$

For q=2, the distortion is:

$$D_i^2 = \sum_{j=1}^{j=P} \sum_{r=1}^{r=R} (x_{j,r} - x_{i,r})^2$$

For q=∞, the distortion is:

$$D_i^\infty = \sum_{j=1}^{j=P} \max\{|x_{j,1} - x_{i,1}|, |x_{j,2} - x_{i,2}|, \ldots, |x_{j,R} - x_{i,R}|\}$$

The output of the vector median filter is the vector which is globally the "closest," relative to the distortion measure q, to all the other vectors within the set P vectors. The output vector, $x_k$, can be considered to be the most representative vector of all the P input vectors in the set since it is associated with the least distortion within the vector set. The video frame corresponding to this feature vector can be considered to be the most representative of the set of video frames associated with the set of input feature vectors.

Referring to FIG. 1, in a first embodiment of the present invention video segments 10 are input to a vector median filter 12. The vector median filter 12 identifies the key frames 14 that are the most representative of the video segment 10 where the boundaries of the segment 10 has been established by the methods of the present invention or otherwise. The key frame 14 from each of a plurality of segments may be used as a summary of the video sequence comprising that plurality of segments. For example, assume a jth segment of video with two identified time boundaries, times t(j) and t(j+1), where j=1, 2, . . . ,N. The jth segment contains M frames of video which are denoted here as F(t(j)), F(t(j)+i), . . . F(t(j)+M−1). The video frames can be defined as a set of R-dimensional feature vectors denoted by h(t(j)), h(t(j)+1), . . . h(t(j)+M−1) where the vector h(t(j)+i) is associated with the frame F(t(j)+i) and where $0 \leq i \leq M-1$. The next video segment (the (j+1)th segment) starts at time t(j+1) such that t(j+1)=t(j)+M where j<N.

The application of the vector median filter 12 to the vectors h(t(j)), h(t(j)+1), . . . h(t(j)+M−1) permits identification of the vector producing the least distortion among the set of vectors corresponding to the video segment 10. This vector will correspond to the frame, belonging to the set of frames F(t(j)), F(t(j)+i), . . . F(t(j)+M−1), which is most representative of the content of the frames in the segment 10. A key frame 14 can be determined in the same fashion for each segment in the video sequence. The resulting series of key frames 14 constitutes a summary of the video sequence where each key frame is the most representative frame of each segment. While the number of frames M may vary from segment to segment, the overall number of key frames identified by this embodiment can be controlled if the input frame rate is known.

FIGS. 2A through 2D illustrate a flow chart for one technique of performing the method of key frame identification of the first embodiment of the present invention where the feature vector utilized is based on an image histogram. The variables used in the flow chart include: j—the number of the first frame of the segment; b—the segment number; acc_dif—the distortion or cumulative distance between the current frame and the prior frames under consideration; min_dif—the current minimum cumulative distortion; n—the current frame; m—the number of frames being considered (from the beginning of the segment to the current frame (n)); vm(b)—the vector median for the bth segment; P(b)—the number of frames in the bth segment, L—the number of segments in the video sequence and HUGE is a large number that cannot be obtained by any cumulative distance.

Figure 3:
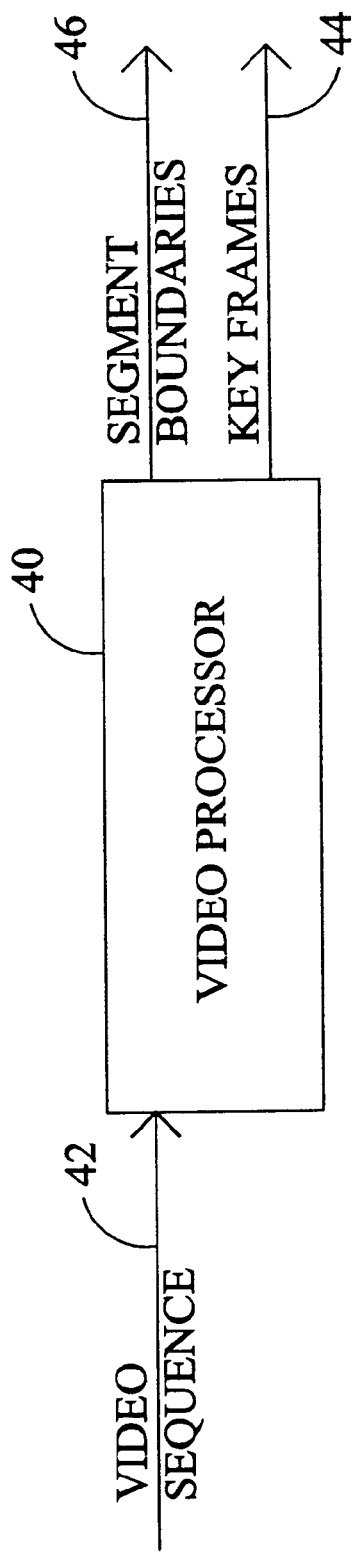
FIG. 3 illustrates the method of identifying segment boundaries and key frames of the second embodiment of the present invention.
Figure 4A:
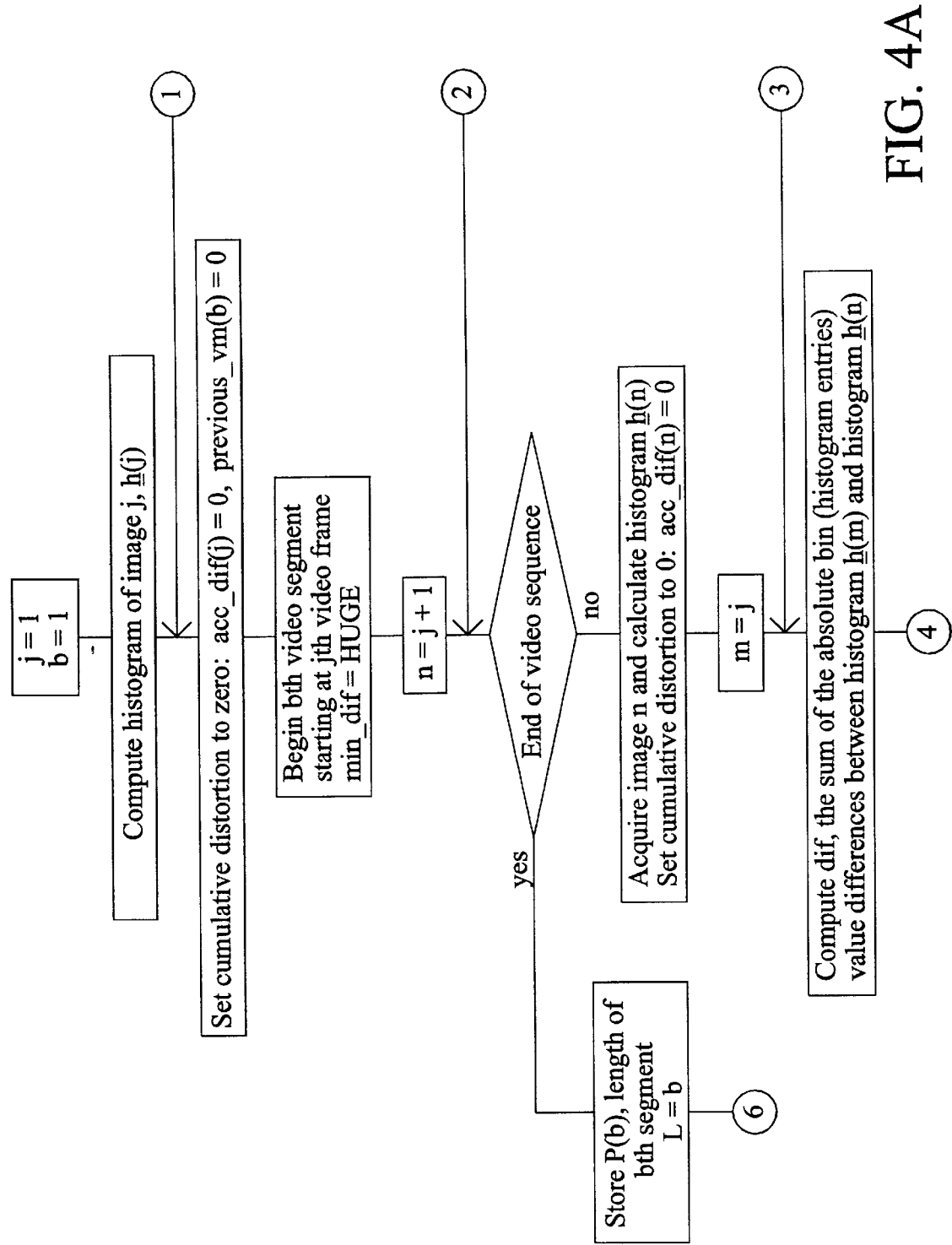
FIG. 4A is a flow chart illustrating one technique for performing the method of segment boundary and key frame identification of the second embodiment of the invention.
Figure 4B:
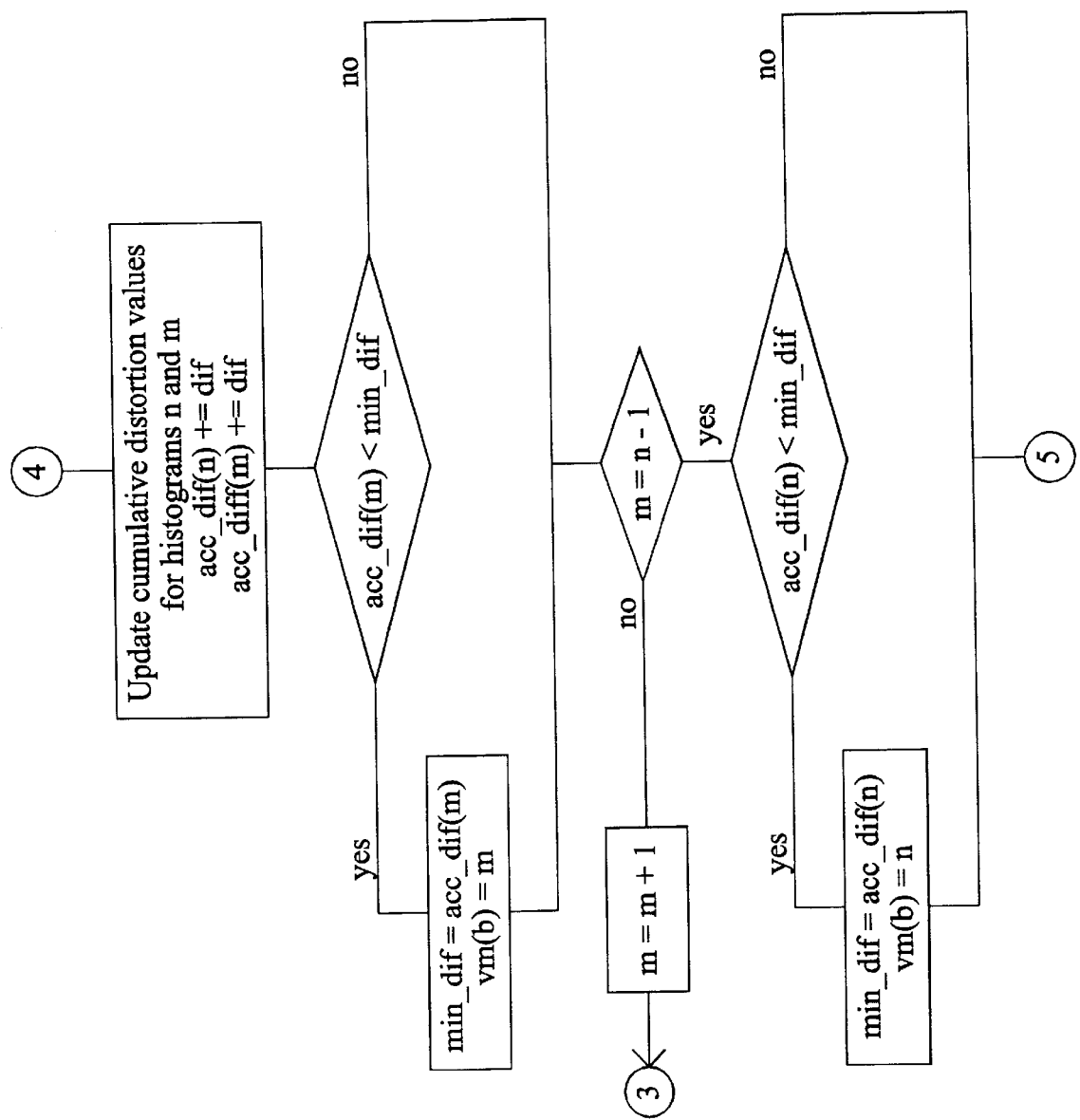
FIG. 4B is a continuation of the flow chart of FIG. 4A.
Figure 4C:
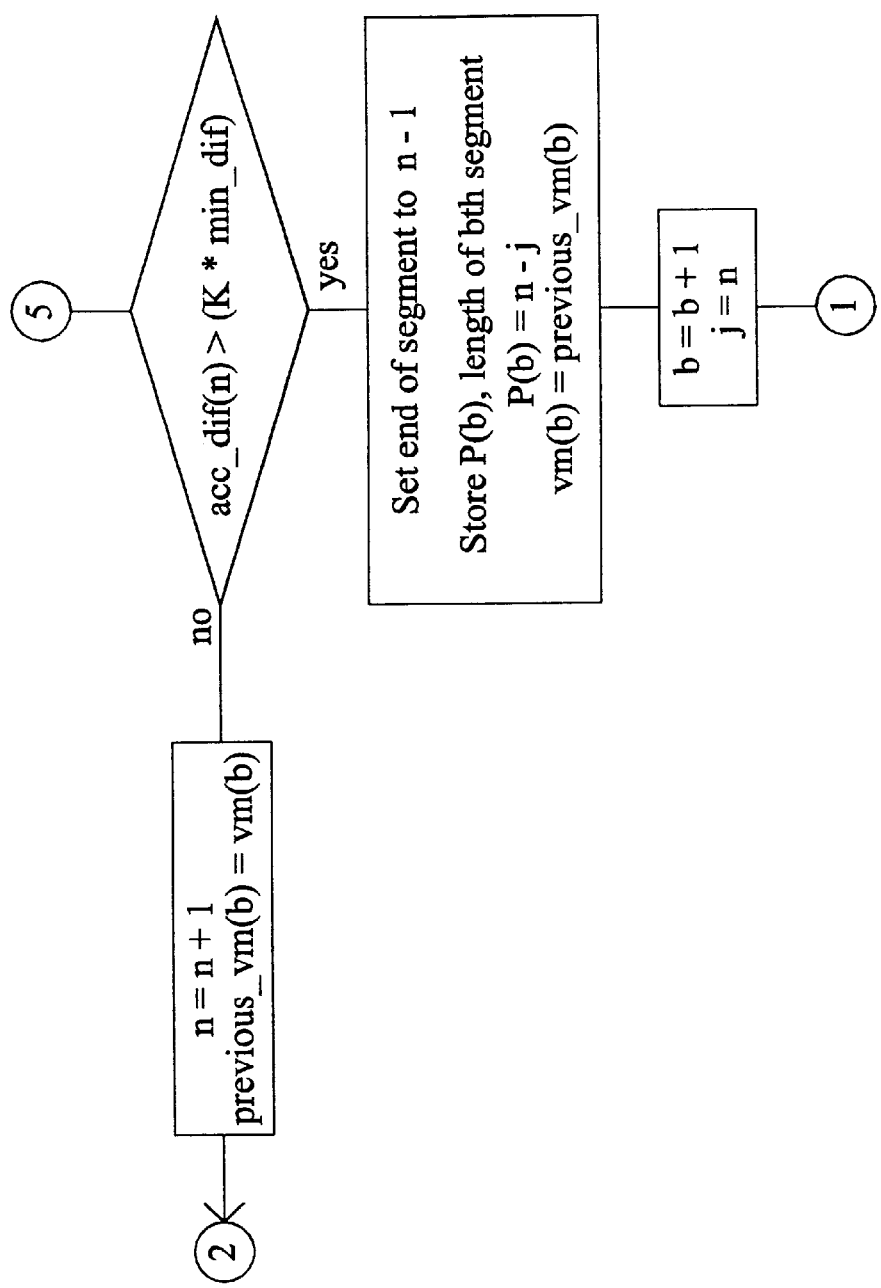
FIG. 4C is a continuation of the flow chart of FIG. 4B.
Figure 4D:
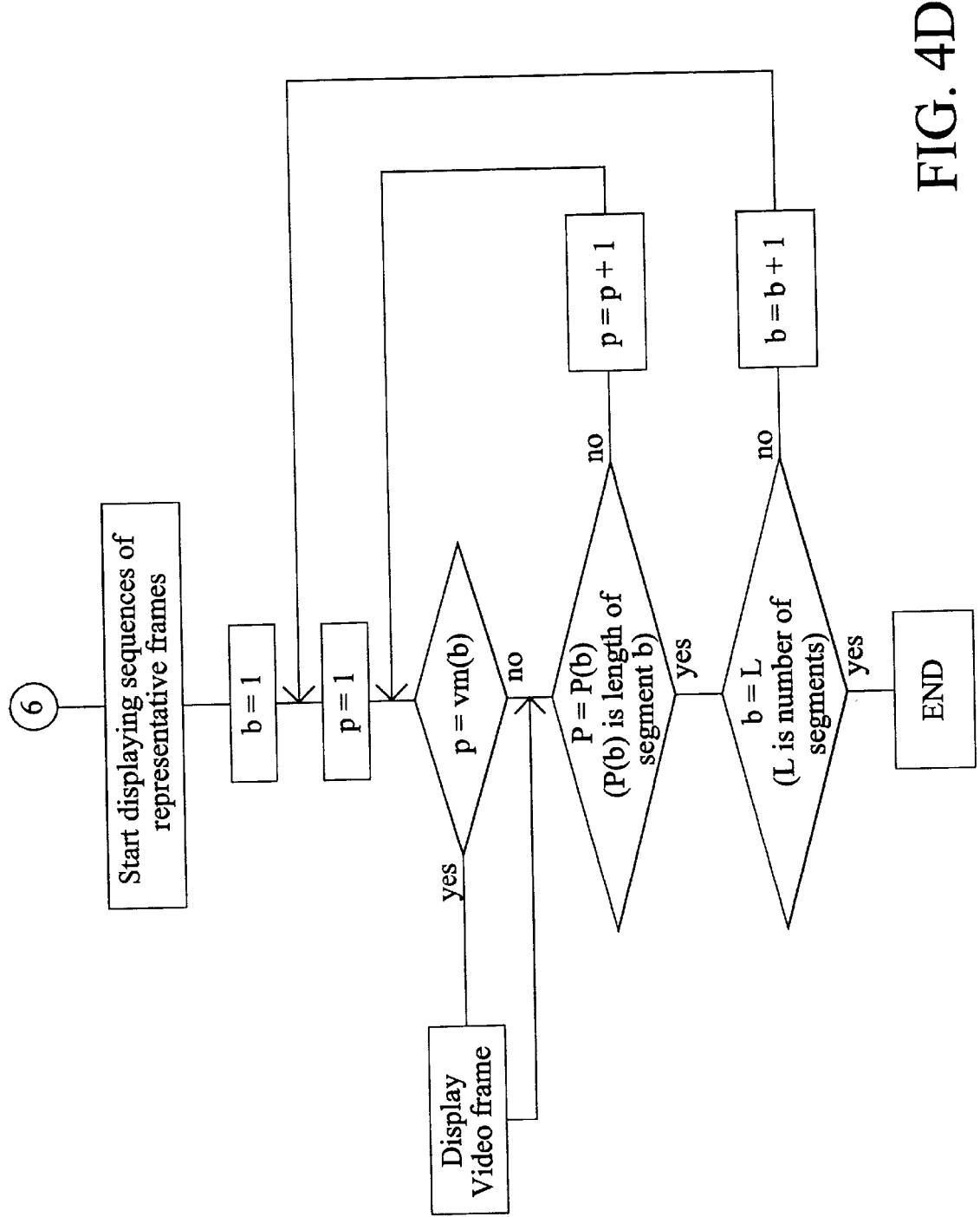
FIG. 4D is a continuation of the flow chart of FIG. 4C.

Referring to FIG. 3, in the second embodiment of the present invention a video processor 40 receives a video sequence 42. The video processor 40 produces an automatic selection of key frames 44, similar to FIG. 1, such that the cumulative frame difference between the key frame and the other frames within the segment does exceed a given level of distortion. This ensures that the overall distortion within a segment remains bounded relative to the most representative video frame. This criterion also provides a technique to determine the video segment boundaries 46 "on-line" simultaneously with the key frames 44.

In the second embodiment of the present invention the boundaries 46 of the video segments do not need to be pre-specified. To determine the boundaries 46 of a video segment, the boundaries 46 are designated as a variable which is calculated "on-line" as the each successive frame of video is received and "viewed." While video comprises consecutive frames, a sampling technique can be used to select frames which are subsequent but not necessarily consecutive. When the distortion or cumulative distance resulting from the addition of a last frame to the set exceeds some predefined threshold, for the first time, the boundary ending the segment is detected. For example, a consecutive set of video frames, F(t(j), F(t(j)+1) . . . F(t(j)+1) . . . F(t(j)+1)−1), F(t(j)+1), corresponding to a time period t(j), t(j)+1 . . . t(j+1)−1, t(j+1), is to be segmented. A first segment boundary is assumed to have been established by this method at time t(j). The segment starting at time t(j) is segment j. Since video comprises a set of consecutive images, the first image of the first segment is assumed to correspond to the first frame of the sequence. The first segment boundary of any subsequent segment can be determined by successively locating the second boundary each segment which follows the first segment. As each successive frame is received, a feature vector is computed and added to the feature vector set, beginning with h(t(j)) corresponding to frame F(t(j)). The minimum distortion of the set of vectors is evaluated with the vector median filter. If the cumulative minimum distance, $D^q_{(1)}$, calculated by the vector median filter when applied to frames F(t(j)), . . . F(t(j+1)), exceeds some predefined threshold T for the first time when frame F(t(j+1)) is added to the set of vectors, the non-inclusive, ending segment boundary for the segment j is declared to be at time t(j+1). In other words, the time t(j+1) represents the beginning of the next video segment (segment j+1) if the minimum cumulative distance is less than the threshold T ($D^q_{(1)}(t(j+1)-1) < T$) for the frame immediately preceding this frame (frame F(t(j+1)−1)), but the minimum cumulative distortion exceeds the threshold T ($D^q_{(1)}(t(j+1))-1 \geq T$) when frame F(t(j+1)) is added to the set.

As an alternative criterion, a shot boundary may be declared when the cumulative distance associated with the most recent frame exceeds some function of the minimum distance in the set of vectors, such as the product of the minimum distance and some factor (k) which is greater than one. In other words, a new segment is detected when:

$$D^q_{t(j+1)-1} < k D^q_{(1)}(t+(j+1)-1) \text{ and } D^q_{t(j+1)} < k D^q_{(1)}(t+(j+1)) \text{ where } k > 1.$$

The threshold T or the factor k may be selected as a function of the noise power in the image or as a function of a target compression ratio to be achieved by the video summary or some combination of noise power and target compression ratio.

When segment boundaries are detected, the key frame for the segment is the output of the vector median filter applied to the frames of the segment as described in the first embodiment. As a result, summaries can be produced "on-line" where the shot boundaries are detected and a key frame within each shot is simultaneously selected as the frames of video are "viewed" without the requirement to store the entire video sequence for review and processing. Further, a shot containing a single frame can be identified by the method.

Referring to FIGS. 4A through 4D, a flow chart illustrates a technique of implementing the method of the second embodiment of the present invention where the feature vectors are image histograms and a shot boundary is declared when the maximum cumulative distance in a candidate video segment exceeds the minimum distortion calculated by the vector median filter multiplied by distance multiplier k. The variables are the same as those described above for FIG. 2. An additional variable, previous_vm(b), is used to denote the index of the previously selected vector median for segment b. This variable records the position of the key frame once a segment boundary has been detected. Table A provides a sample source code written in the Java programming language for implementing this technique of the second embodiment.

Figure 5:
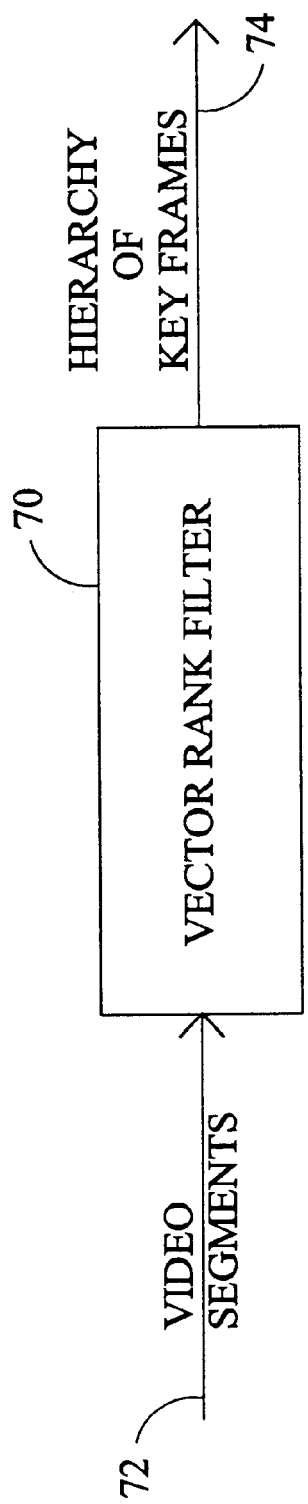
FIG. 5 illustrates the method of identifying a hierarchy of key frames of the third embodiment of the present invention.
Figure 6:
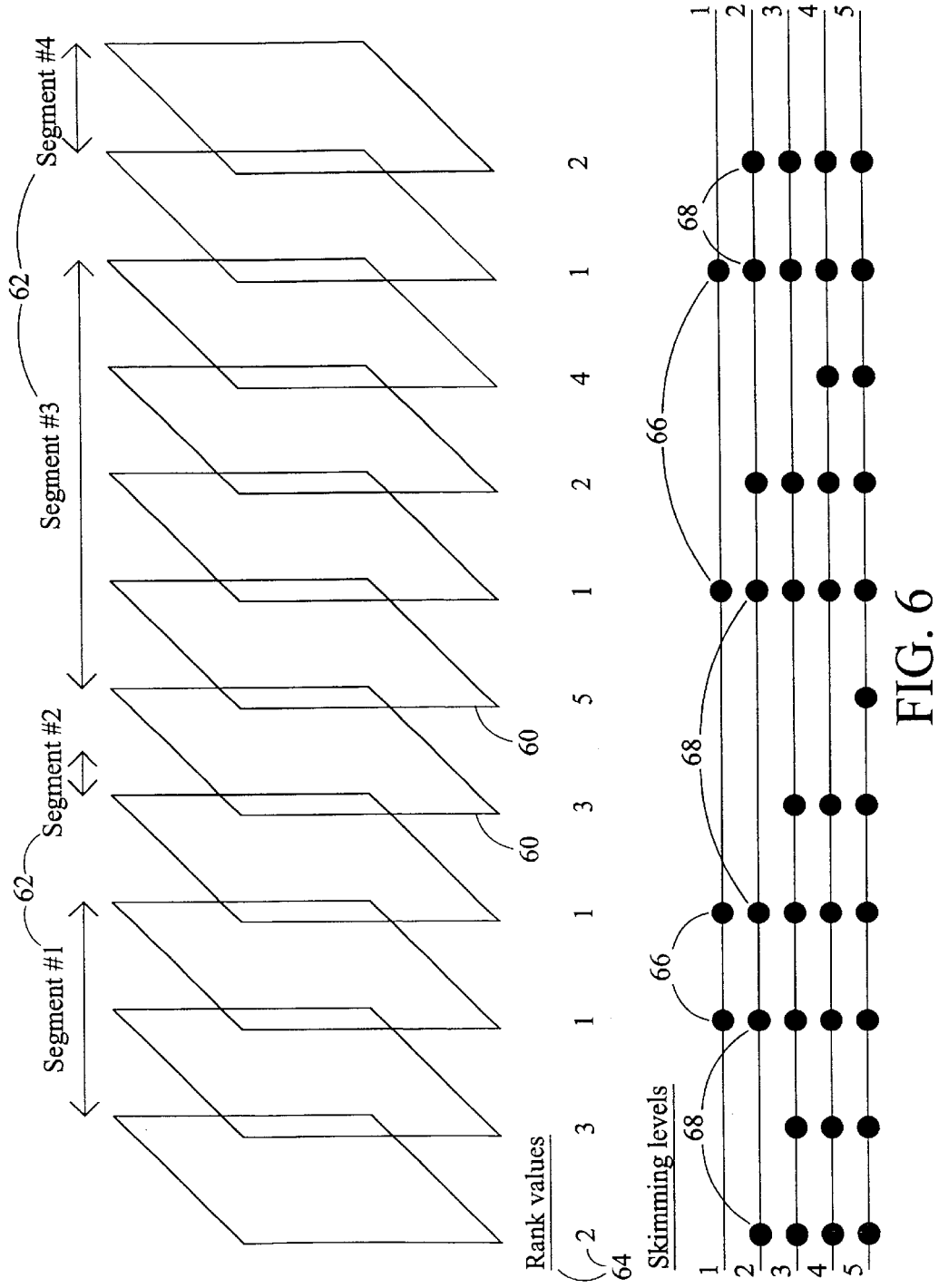
FIG. 6 is a schematic representation of an exemplary video sequence where each frame within a segment has been ranked according to the relative distortion of the segment produced by the frame.
Figure 7A:
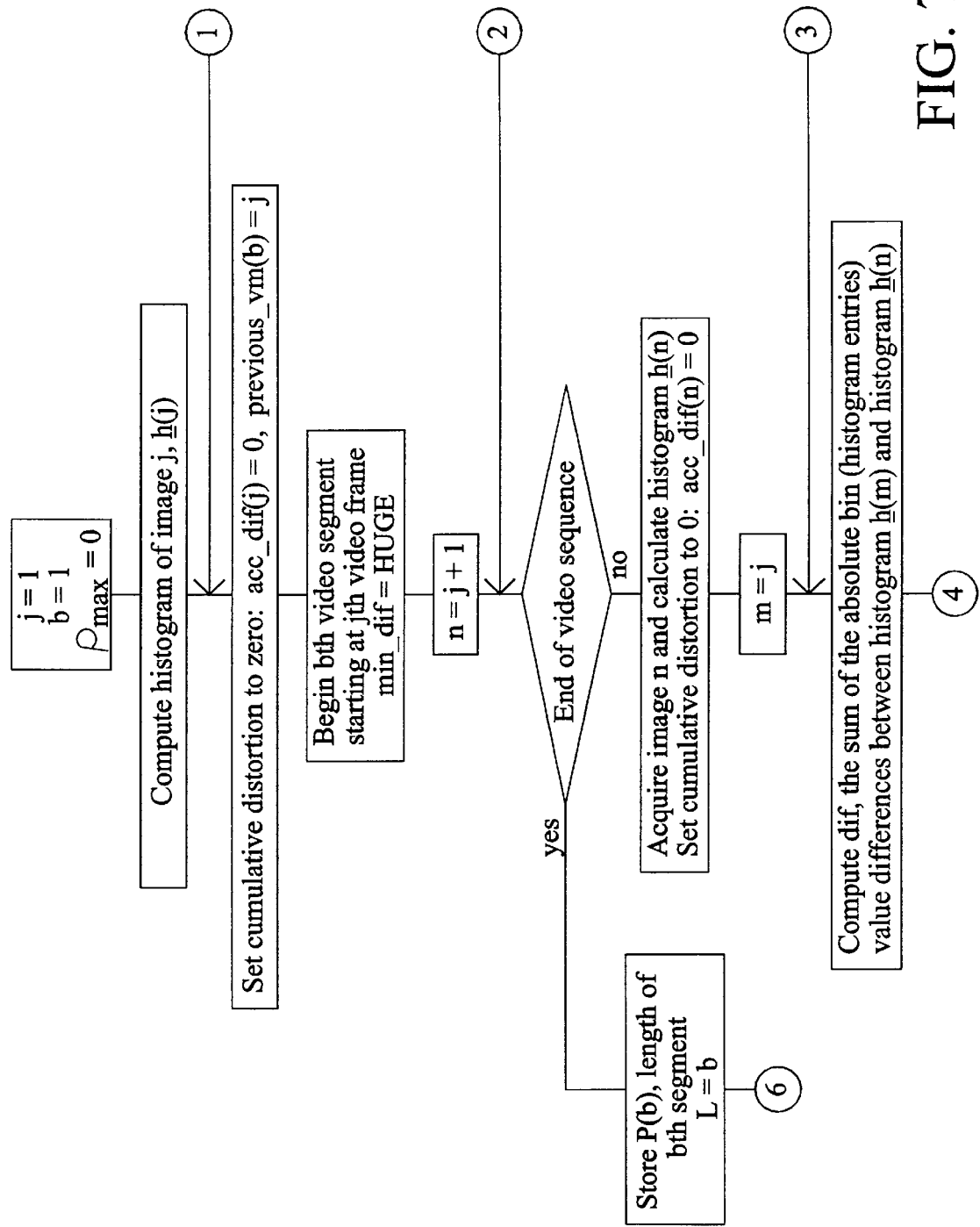
FIG. 7A is a flow chart illustrating one technique for performing the method of key frame ranking and compilation of hierarchical summaries of the third embodiment of the invention.
Figure 7B:
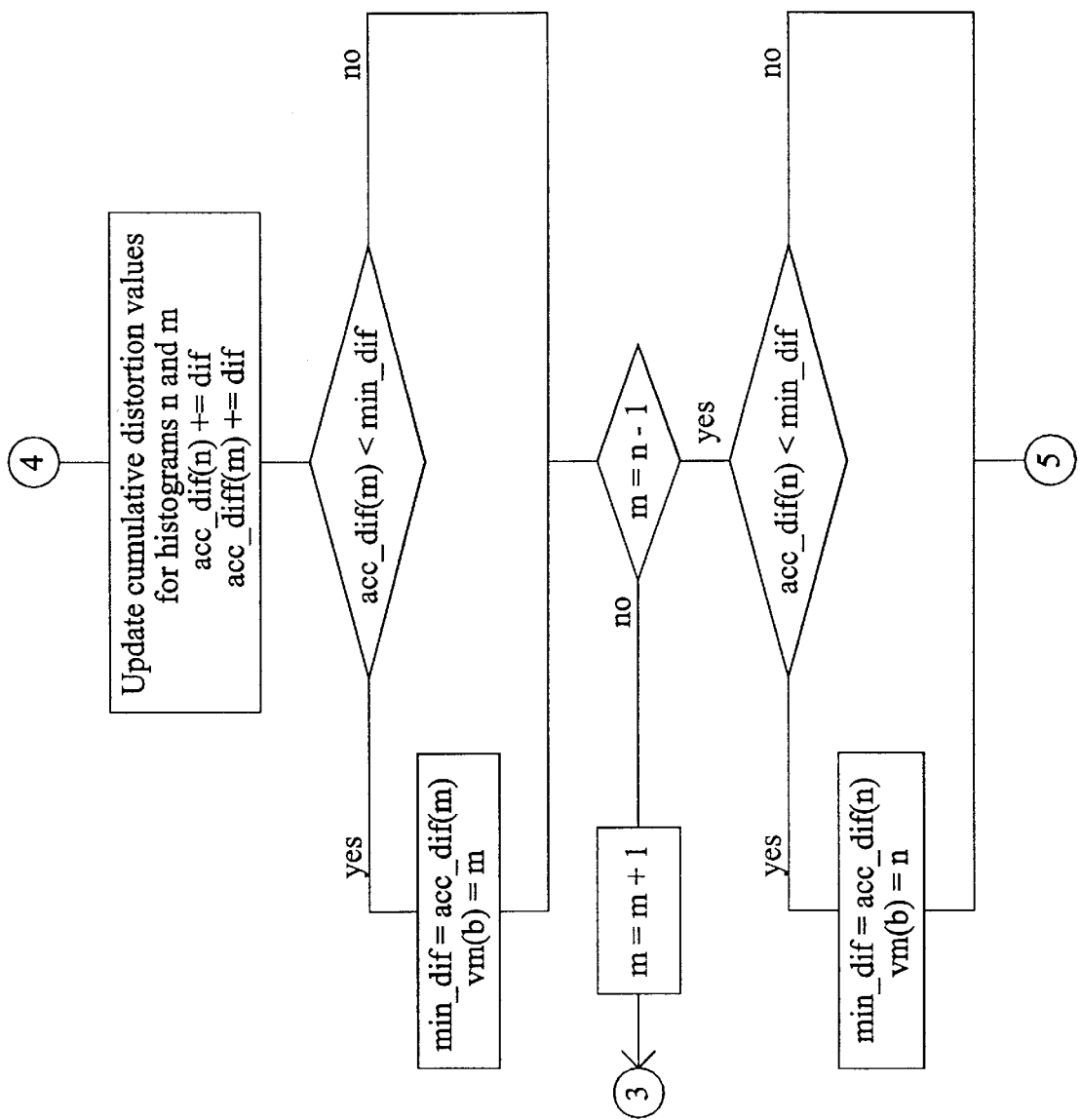
FIG. 7B is a continuation of the flow chart of FIG. 7A.
Figure 7C:
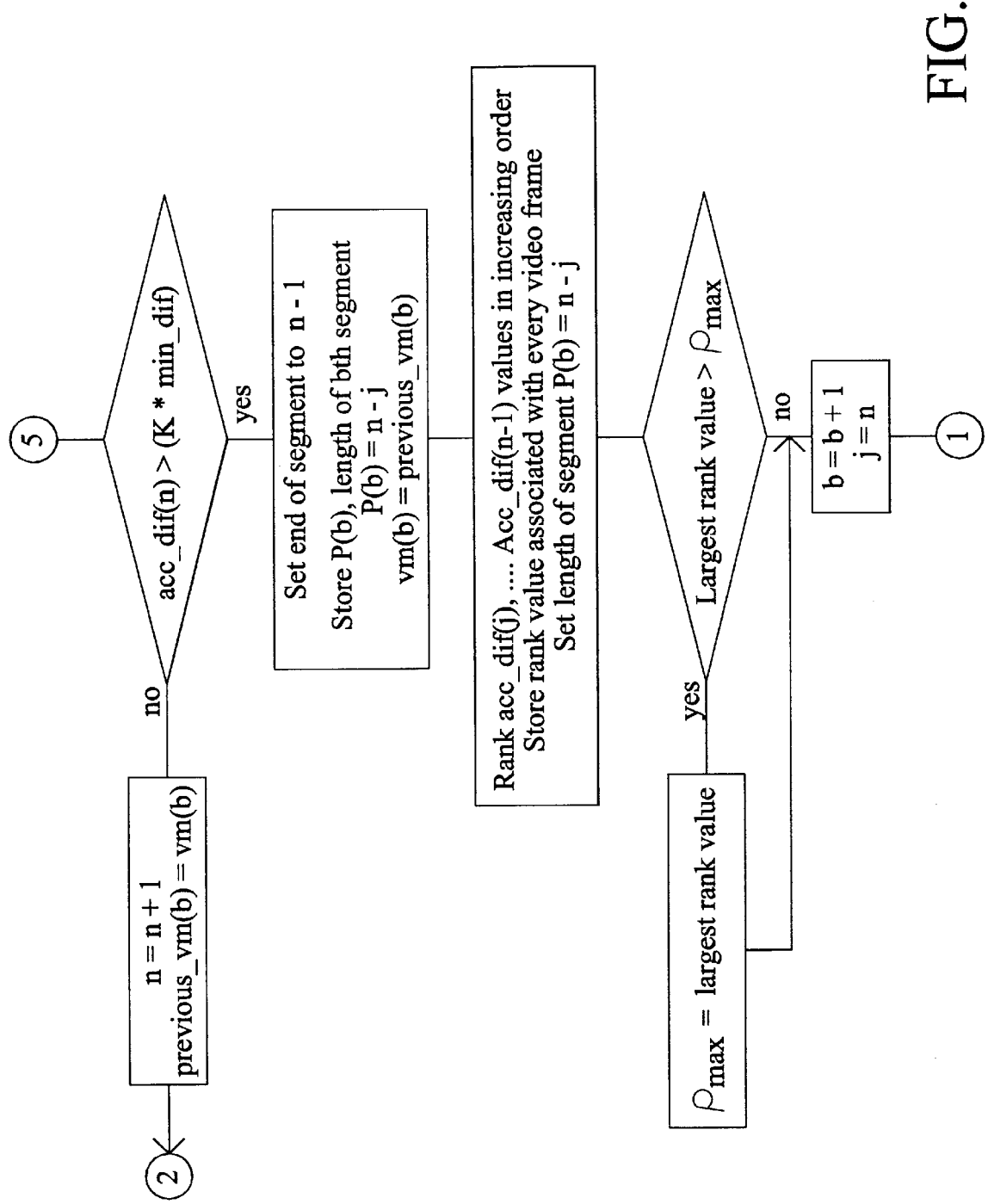
FIG. 7C is a continuation of the flow chart of FIG. 7B.
Figure 7D:
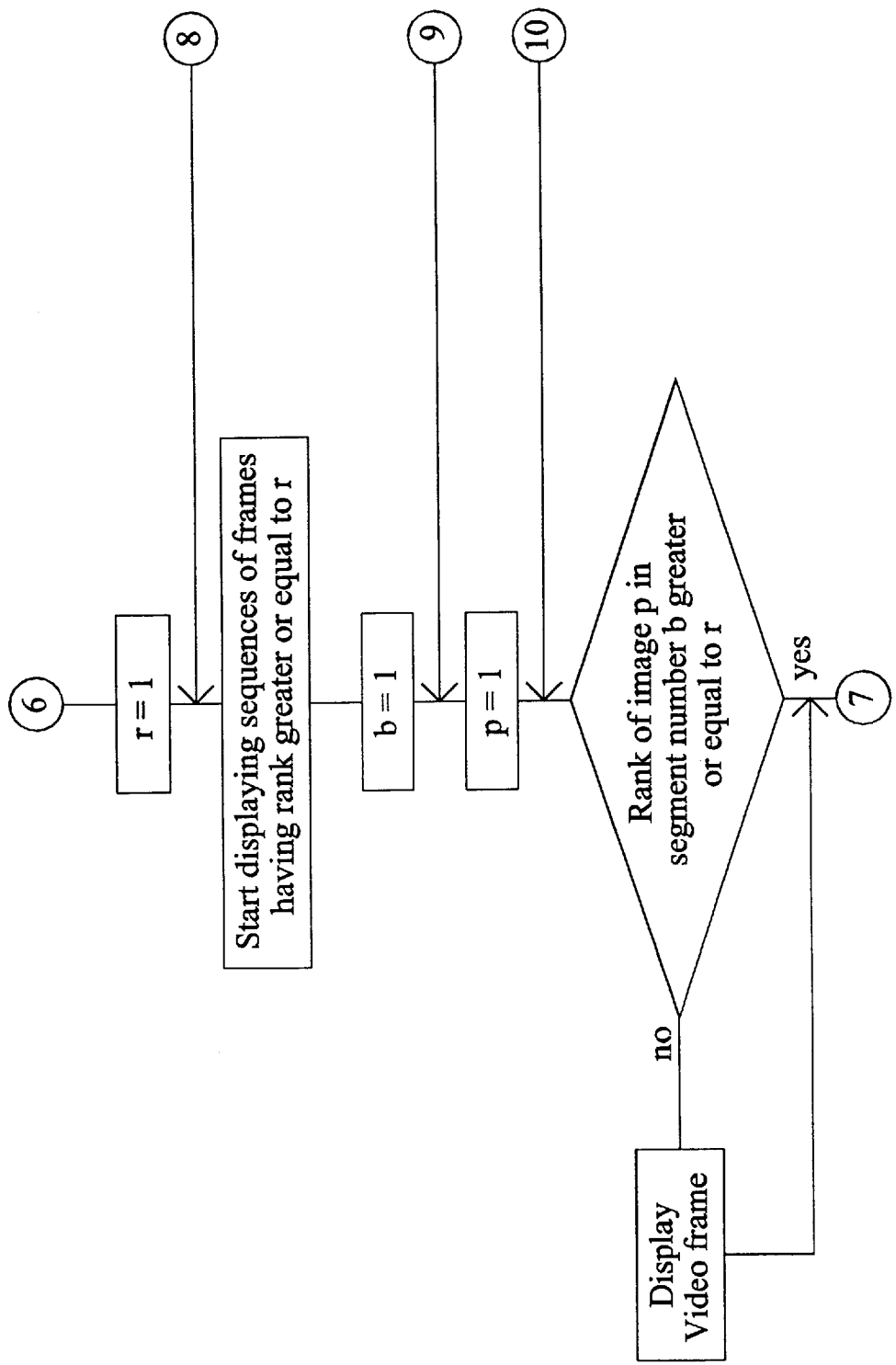
FIG. 7D is a continuation of the flow chart of FIG. 7C.
Figure 7E:
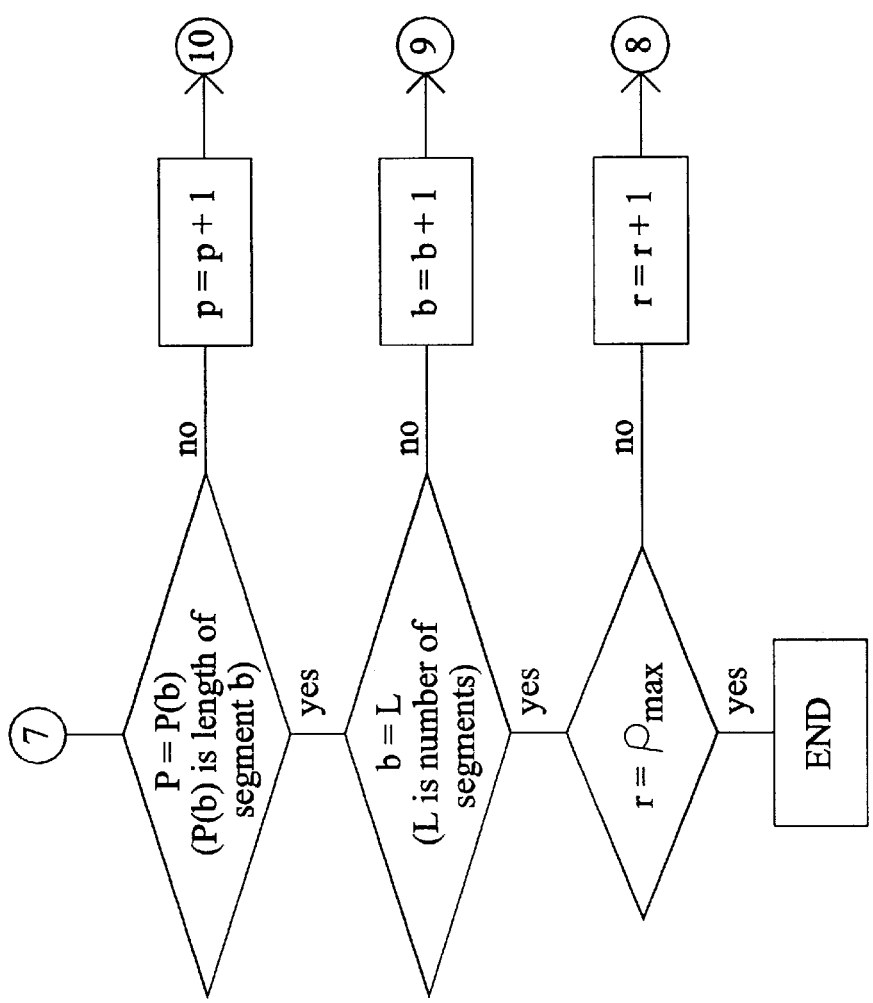
FIG. 7E is a continuation of the flow chart of FIG. 7D.

Referring to FIG. 5, in a third embodiment of the present invention a hierarchical process provides a video skimming methodology based on the frame ranking results produced by a vector rank filter 70. The process identifies a hierarchy of frames 74 within a video segment 72 which is the input to the vector rank filter 70. Hierarchical summaries can be constructed by skimming different numbers of key frames from each video segment on the basis of the key frame's rank in the hierarchy of key frames 74. The method can easily produce a hierarchical series of summaries with each successive summary containing a greater number of the most representative frames from each shot. The result is a video content driven temporal sub-sampling mechanism based on the rank values produced by the vector rank filter. FIG. 6 illustrates an exemplary video sequence of eleven frames 60 which has been segmented into four segments 62 by the methods of the present invention or otherwise. The vector rank filter is used to generate the rank 64 of the frames 60 within each segment 62 according to the distortion or cumulative distance produced by the frame 60 in the set of the frames of the segment 62. To skim the video, frames 60 can be selected for inclusion in a summary on the basis of the relative cumulative distance produced by the frame in the video segment 62 of which the frame 60 is a member. Skimming the video at level one, would include the frames of rank one 66 in the coarsest summary. A level two summary could include frames ranked one 66 and two 68. At each level of the hierarchy, additional frames 60 would be assigned to the summary until all of the frames 60 of the sequence are included in the summary of maximum rank. While each increase in rank adds frames 60 to the summary which are less representative of the content of the segment 62, each summary comprises those frames 60 which are the most representative of the sequence. FIGS. 7A through 7E illustrate a flow chart of a technique of implementing this third embodiment of the present invention. The variables used in FIGS. 7A through 7E are those identified above for FIG. 4.

A video skimming system can be constructed to display a skimmed video summary of frames of any specified range of ranks. This effectively provides temporal compression of the original video sequence. For this purpose, the distortion rank of each of the video frames must be stored so the display system can identify the video frames to be included in the designated summary. Index and rank information can be stored in a database with the video sequence to provide temporal, hierarchical descriptions of a video sequence.

A system displaying hierarchical summaries is an alternative to showing video frames following a linear "low temporal frequency" to "high temporal frequency" decomposition. In each segment, the rank 1 output of the vector rank filter can be viewed as the "average" key frame since it is the most representative frame of all frames of the segment. Conversely, the video frame of highest rank can be viewed as the frame displaying the most content detail since it is the least representative frame of the segment. The system is nonlinear with the benefit that temporal filtering is not required. Table B illustrates a computer program in the Java source language for generating hierarchical video summaries. Fine and coarse summaries are calculated on-line utilizing the program.

In connection with identification of key frames utilizing the techniques of this invention, hierarchical summaries of key frames can be generated utilizing other methods, including a Linde-Buzo-Gray clustering algorithm (also known as a K-means algorithm) as described in the paper AN ALGORITHM FOR VECTOR QUANTIZER DESIGN, IEEE Transactions on Communications, January 1980; or a method such as that described in the co-pending application of Ratakonda, Ser. No. 08/994,558, filed Dec. 19, 1997, which relies on the rate of change of images in consecutive frames to constrain the clustering process.

Figure 8:
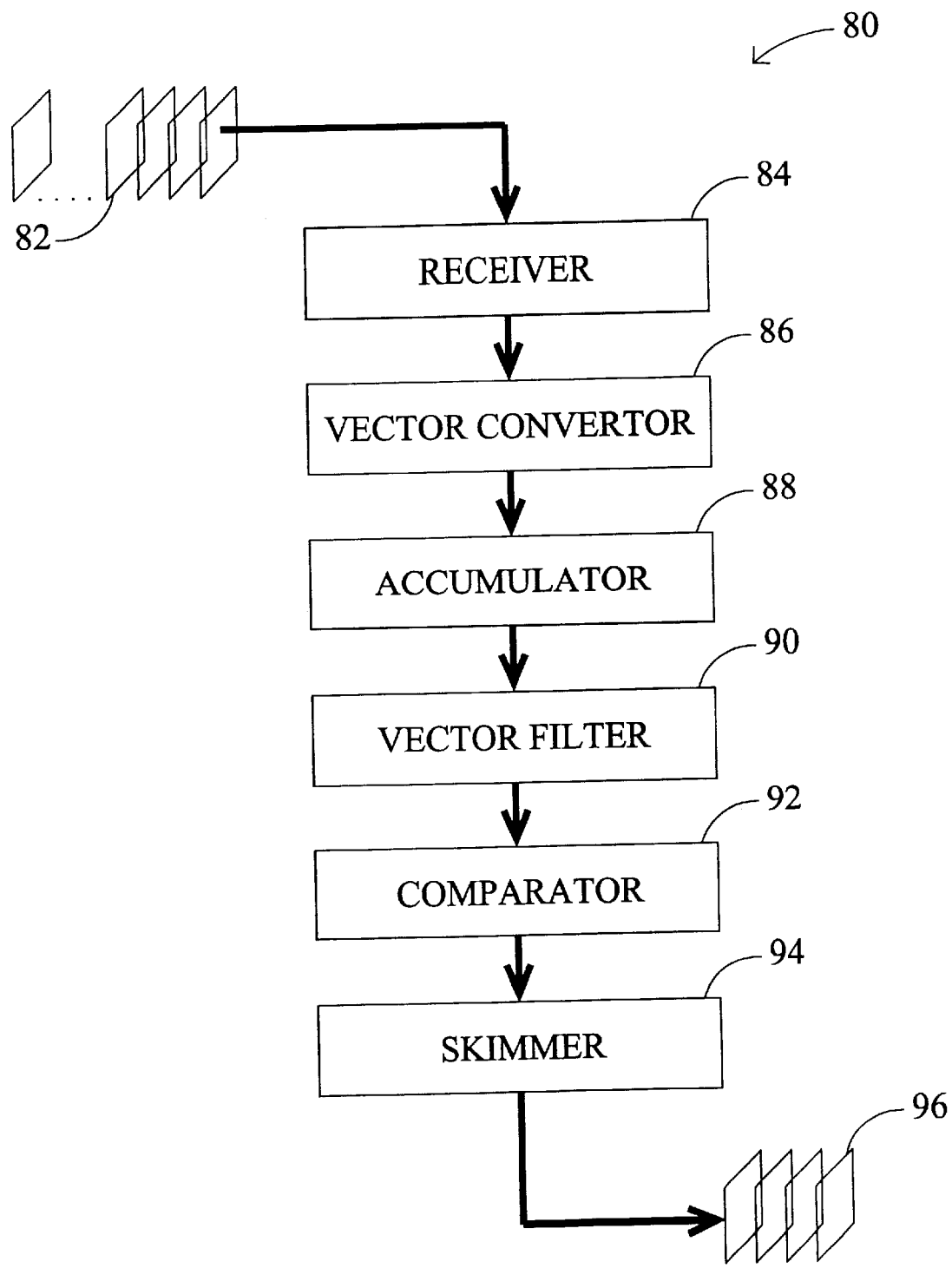
FIG. 8 is a schematic illustration of video sequence summarizing appliance.

FIG. 8 illustrates a summarizing appliance 80 for constructing summaries of video sequences according to the methods of the three embodiments of the present invention. A video sequence comprising a plurality of video fields, frames, or other representations of the video content (collectively referred to hereafter as frames) 82 is input to a receiver 84 of the appliance. The frames 82 are transferred from the receiver 84 to a vector convertor 86 which characterizes each frame as a feature vector. As successive feature vectors representing successive frames 82 of the video sequence are defined, the feature vectors are accumulated in an accumulator 88 in an expanding set of vectors. The distortions or cumulative distance measures of the set of vectors are calculated in the vector filter 90 as new feature vectors are added to the set. The vector filter 90 ranks the feature vectors according to the distortion that each feature vector produces in the set of feature vectors in the accumulator 88.

Video segments may be identified before input of the frames 82. For example, system resource limitations or usage conditions may limit the rate of key frame selection. In this case, the input sequence might be arbitrarily divided into segments having a fixed upper limit to the number of frames. If video segments have not been identified in the input frames 82 the cumulative distance associated with the most recent vector added to the set is calculated in the vector filter 90 and compared to some threshold value in a comparator 92. When the cumulative distance associated with the feature vector most recently added to the set has obtained some predefined relationship to the threshold value or the number of frames reaches the upper limit, a segment boundary is declared.

When a segment boundary is declared in the comparator 92 or if segment boundaries are defined in the input frames 82, the output of the vector filter 90 is used in the skimmer 94 to identify and record the frames that are most representative of the content of the video sequence. If the vector filter 90 is based on the more specialized vector median filter, the skimmer 94 can identify the most representative frame as a key frame 96 in each video segment. A vector filter 90 based on the more general vector rank filter may be used to rank frames according to the relative homogeneity of their content or their representativeness of the content of a video segment. The video skimmer 94 can identify frames according to a hierarchy of representativeness based on ranking the feature vectors according to relative cumulative distance or according to a clustering technique. With this technique, multiple key frames 96 can be selected from each segment and hierarchical summaries of the plurality of frames 82 can be created.

The key frame identification process described heretofore may be thought of as a first level summarization. The techniques of the present invention can also be applied to the key frames of first level summaries to produce coarser summaries of the original video sequence. For example, it might be desirable to summarize an hour's video in 30 frames or a 30 second duration summary. In a first level summarization as described above, one or more key frames are identified for each segment of the video. The resulting summary may exceed the budget of key frames for the desired summary. To achieve a more compact summary the vector rank filtering techniques of the present invention can be applied to the video sequence comprising key frames identified in the first level summarization to select the most representative or salient key frames of that set for inclusion in the coarser summary.

Likewise, system resources or usage conditions may dictate a predetermined, fixed rate of key frame selection in terms of the rate at which the original video sequence is being acquired by the system. The number of segments and, therefore, the number of key frames, identified by the first level selection may vary for each of the fixed unitary display periods. If the key frames identified in the first level selection for each period are processed with the vector rank filter techniques of the present invention, the most relevant frame or frames for each predetermined, fixed period of the original video can be identified. This process can be applied on-line by caching key frames identified by the first level selection and skimming the key frames accumulated for each period. The maximum number of frames that must be accumulated, in addition to the frames of the first level summary, is equal to the maximum number of key frames that can be produced over that pre-determined, fixed period. Alternatively, the cumulative distortion of all the key frames for a fixed length display period of the original video can be computed and the key frame producing the least cumulative distortion can be selected for each period by applying the vector rank filter. This method requires access to the all of the frames of the video segment, as well as the key frames, and, therefore, requires greater storage and processing capabilities.

In some applications, the desired number of key frames for a summary may not be known when the key frames are identified. For example, bandwidth limitations or user preferences may limit the number frames that a particular user desires to obtain from a server that supplies video summaries. The server may compute multiple summaries of the same video sequence containing differing numbers of key frames to supply on demand. A more resource efficient method of constructing on-demand summaries of varying degrees of coarseness is to produce a first level summary having a number of frames sufficient to provide the most detailed summary desired. The methods of the present invention can then be applied to rank the saliency of the selected key frames so that a subset of the most salient key frames can be extracted in response to a request by a user for a summary of specified detail. The saliency of each key frame may be measured, for example, by its rank in distorting the set of key frames or by a function of the relative distortion rank and the length of the video segment represented by the key frame. For example, the saliency might be an expression of proportionality of the relative distortion and length of the segment represented by a frame or might be computed as a multivariate function of a set of quantities comprising the associated distortion and segment length. The first level summary information can be stored in the form of image data for the key frames or indices to the frames if the entire video sequence is available. In addition, the saliency measures associated with each key frame or some intermediate data from which saliency can be determined, is stored in anticipation of a user request for a summary of a specified level of detail.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

TABLE A

```
/***********************************************************************
***********************/
/** Java applet implementing on-line video summarization   **/
/** using the vector median filter                         **/
import java.awt.*;
import java.applet.*;
import java.net.*;
import java.awt.image.*;
public class vm_applet extends Applet implements Runnable
{
    private final int OX = 260;
    private final int OY = 0;
    private final int REFRESH = 100;
    private final int LOOP_WAIT = 4999;
    private final int down_off = 145;
    private final int left_off = 0-250;
    private final int HISTLEN = 256;
    private final int MAX_KEYFRAMES = 5;
    private final double alpha = 3.5;
    private final int minShotLength = 10;
    private final int seg_maxlen = 45;
    private final int seg_thresh = 17;
    private final int min_runlen = 7;
    private static int xPos = 40;
    private static int yPos = 40;
    private static int pbest_init;
    private String [ ] msgs;
    private Image [ ] imgs;
    private Image [ ] KeyFrame_imgs;
    private int img_count = 0;
    Graphics currg = null;
    ImageObserver io;
    private static int paint_flag;
    private static String str;
```

TABLE A-continued

```
    private int width;
    private int height;
    static int loaded_count = 0;
    static boolean imgs_all_loaded = false;
    private int [ ] [ ] hist;
    private int [ ] store_lowseg;
    private int [ ] store_hiseg;
    private int [ ] acc_dif;
    private int count_segs = 0;
    private boolean [ ] flag_shot;
    private MemoryImageSource [ ] theKeyFrames;
    private int ScanBase;
    private Image theLightGrayImage;
    private double mu = 0.0;
    private double sigma = 0.0;
    private int counter = 0;
    private int count_vm = 0;
    private int prev_count_vm = 0;
    private int seg_len = 0;
    private int vm_index=0;
    private int prev_vm_index=0;
    private int ScanKeyFrames = 0;
    private int prev = 0;
    private int base = 0;
    Thread t = null;
    public void init( ){
        String num_images;
        num_images = getParameter("ImageCount");
        img_count = Integer.valueOf(num_images).intValue( );
        msgs = new String[img_count];
        for( int k = 0; k < img_count; k++)
        {
            msgs[k] = getParameter("Image"+String .valueOf(k));
        }
        // Prepare screen display environment
        Rectangle ctn = getParent( ).bounds( );
        setBackground(Color.lightGray);
        resize(ctn.width, ctn.height);
        currg = getGraphics( );
        imgs = new Image[img count];
        KeyFrame_imgs = new Image[MAX_KEYFRAMES];
        hist = new int[img_count][ ];
        store_lowseg = new int[img_count];
        store_hiseg = new int[ img_count];
        acc_dif = new int[ img_count ];
        flag_shot = new boolean [img_count];
        // Provision memory for histograms
        for( int k = 0; k < img_count; k++)
        {
            hist[k] = new int[HISTLEN];
        }
        theKeyFrames = new MemoryImageSource[img_count];
        theLightGrayImage = MakeLightGrayImage(90,60);
        // HISTLEN entries in histogram
        // 256 is max sample value difference
        pbest_init = img_count * HISTLEN * 256;
    }
    // Utilities for displaying video sequence and
    // keyframes
    public void paint(Graphics g, int xcoord, int ycoord, Image frame, int fwidth,
int fheight, String caption)
    {
        if( g == null )
        {
            g = getGraphics( );
        }
        g.setFont( new Font("Arial", Font.BOLD, 11) );
        io = null;
        g.drawImage(frame,xcoord,ycoord,Color.black,io);
        g.setColor(Color.yellow);
        g.fillRect(xcoord,ycoord+fheight,fwidth, 15);
        g.setColor(Color.blue);
        g.drawString(caption,xcoord,ycoord+fheight+10);
    }
    public void paint(Graphics g, int xcoord, int ycoord, Image [ ] keyframe, int
kfwidth, int kfheight, int entryBase, int KeyFrameCount, int [ ] lowBound, int [ ]
highBound, boolean [ ] shot_detect )
    {
        int index;
```

TABLE A-continued

```
        int shiftx;
        if( g == null )
        {
            g = getGraphics( );
        }
        g.setFont( new Font("Arial", Font.BOLD, 11));
        io = null;
        shiftx = 0;
        index = 0;
        for( int kf = entryBase; kf < entryBase+MAX_KEYFRAMES; kf++)
        {
g.drawImage(keyframe[index++],xcoord+shiftx,ycoord,Color.black,io);
            if( kf < KeyFrameCount )
            {
                str = "#" + String.valueOf( lowBound[kf] );
                str += "of [";
                str += String.valueOf(lowBound[kf]);
                str +=";";
                str += String.valueOf(highBound[kf]);
                str += "]";
                if( shot_detect[kf] == true)
                {
                    g.setColor(Color.green);
                }
                else
                {
                    g.setColor(Color.yellow);
                }
                g.fillRect(xcoord+shiftx,ycoord+kfheight, ktwidth, 15);
                g.setColor(Color.red);
                g.drawString(str,xcoord+shiftx,ycoord+kfheight+10);
            }
            else
            {
                g.setColor(Color.lightGray);
                g.fillRect(xcoord+shiftx,ycoord+kfheight,kfwidth, 15);
            }
            shiftx += (kfwidth+10);
        }
    }
    public void paint(Graphics g)
    {
        g.setColor(Color.red);
        g.setFont( new Font("Arial", Font.BOLD, 11) );
        switch( paint_flag )
        {
            case 0:
                g.drawString(null,0,0);
                break;
            case 1:
                g.drawString(str,xPos,yPos );
                break;
            default:
        }
    }
    public void start( )
    {
        if( t == null )
        {
            t = new Thread(this);
            t.start( );
        }
    }
    public void run( )
    {
        intscan_imgs;
        boolean new_keyframe_detected;
        Image [ ] ref_images;
        Image [ ] ref_keyframes;
        int ref_width;
        int ref_height;
        int ref_keyframeCount;
        int [ ] ref_segmentLowBoundaries;
        int [ ] ref_segmentHighBoundaries;
        boolean [ ] ref_shotBoundariesIndicator;
        int ref_displayedKeyframeIndexBase;
        int ref_seqlen;
        // Get image references
        paint_flag = 1;
```

TABLE A-continued

```
            for( int k =0; k < img_count; k++)
            {
                try
                {
                    imgs[k] = Toolkit.getDefaultToolkit( ) .getImage( new URL(
getDocumentBase( ), msgs[k] ));
                    str = "Getting Reference to image";
                    str += String.valueOf(k);
                    t.sleep( 10 );
                    repaint( );
                }
                catch( Exception e )
                {
                }
            }
            // Load images
            paint_flag = 0;
            repaint( );
            for( int k = 0; k < img_count; k++)
            {
                try
                {
                    io = this;
                    currg.drawImage(imgs[k],-1000,-1000,Color.black,io);
                    t.sleep( 100 );
                }
                catch( Exception e )
                {
                }
            }
            while( !imgs_all_loaded )
            {
                try
                {
                    str = "Loading images . . . ";
                    paint_flag = 1;
                    xPos = 40;
                    yPos = 40;
                    repaint( );
                }
                catch( Exception e)
                {
                }
            }
            // Start video summarization
            while( true )
            {
                try
                {
                    str = "7.4925 Hz Progressive 180×120 Video";
                    paint_flag = 1;
                    xPos = OX + 220 ;
                    yPos = OY + 80;
                    repaint( );
                }
                catch( Exception e )
                {
                }
                ref_seqlen = getSequenceLength( );
                // scan_imgs represents the number of video frames
                // in the set
                for( scan_imgs = 0; scan_imgs < ref_seqlen; scan_imgs++)
                {
                    // summarize and see if segment boundary
                    // has been detected
                    new_keyframe_detected = summarize( scan_imgs );
                    // Get references to arrays to prepare
                    // display of video sequence and keyframes
                    ref_images = getImages( );
                    ref_keyframes = getKeyframes( );
                    ref_width = getWidth( );
                    ref_height = getHeight( );
                    ref_keyframeCount = getKeyframeCount( );
                    ref_segmentLowBoundaries =
getSegmentLowBoundaries( );
                    ref_segmentHighBoundaries =
getSegmentHighBoundaries( );
                    ref_shotBoundariesIndicator =
getShotBoundariesIndicator( );
```

TABLE A-continued

```
                ref_displayedKeyframeIndexBase =
getDisplayedKeyframeIndexBase( );
                // display
                try
                {
                    paint(currg, OX, OY ref_images[scan_imgs],
ref_width, ref_height, msgs[scan_imgs]);
                    if( new_keyframe_detected == true)
                    {
                        paint(currg, OX+left_off, OY+down_off,
ref_keyframes, ref_width>>1, ref_height>>1, ref_displayedKeyframeIndexBase,
ref_keyframeCount, ref_segmentLowBoundaries, ref_segmentHighBoundaries,
ref_shotBoundariesIndicator );
                    }
                    else
                    {
                        t.sleep( REFRESH);
                    }
                }
                catch( Exception e)
                {
                }
            }
            try
            {
                t.sleep( LOOP_WAIT);
            }
            catch( Exception e)
            {
            }
        }
    }
    public boolean summarize( int glob_j )
    {
        int diftot;
        int difval;
        double currentMean;
        double threshold;
        int pbest;
        int frac_num;
        int frac_deno;
        boolean keyframe_flag;
        keyframe_flag = false;
        width = 0;
        while( (width = imgs[glob_j].getWidth(null)) == 0)
        {
        }
        height = 0;
        while( (height = imgs[glob_j].getHeight(null)) == 0)
        {
        }
        // calculate histogram of new video frame
        GetHist(0,0,width,height,glob_j);
        if( glob_j == 0 )
        {
            // initialize cumulative distance registers
            for( int k = 0; k < img_count; k++)
            {
                acc_dif[k] = 0;
                flag_shot[k] = false;
            }
            mu = 0.0;
            sigma = 0.0;
            counter = 1;
            prev = 0;
            prev_count_vm = 0;
            count_vm = 0;
            count_segs = 0;
            seg_len = 0;
            vm_index = 0;
            prev_vm_index = 0;
            ScanKeyFrames = 0;
            ScanBase = 0;
            base = 0;
            for( int imgindex = 0; imgindex < MAX_KEYFRAMES; imgindex++)
            {
                KeyFrame_imgs[imgindex] = theLightGrayImage;
            }
```

TABLE A-continued

```
                flag_shot[0] = true;
                return( keyframe_flag );
            }
        // Shot boundary detection
        diftot = 0;
        for( int m = 0; m < HISTLEN; m++)
        {
            difval = hist[glob_j][m] - hist[glob_j-1][m];
            if( difval > 0)
            {
                diftot += difval;
            }
            else
            {
                diftot -= difval;
            }
        }
        mu += diftot;
        sigma += (diftot * diftot);
        currentMean = mu / (double) counter;
        threshold = currentMean;
        if( counter > 1 )
        }
        threshold += (alpha * Math.sqrt( (sigma -
((double)counter*currentMean*currentMean)) / (double)(counter-1) ));
    }
    // This test determines whether a shot boundary is present
    if( (diftot > threshold) && (glob_j-prev > minShotLength))
    {
        // Shot boundary has been detected.
        // A keyframe will be generated
        prev =]glob_j;
        mu = 0.0;
        sigma = 0.0;
        counter = 0;
        flag_shot[count_segs+1] = true;
        GetDecim(0,0,width,height,base,count_segs);
        store_lowseg[count_segs ] = base;
        store_hiseg[count_segs++] = glob_j-1;
        base = glob_j;
        seg_len = 0;
        prev_vm_index = base;
        acc_dif[base] = 0;
        count_vm = 0;
        keyframe_flag = true;
    }
    else
    {
        counter++;
        // calculate vector median filter
        acc_dif[ glob_j ] = 0;
        pbest = pbest_init;
        // calculate cumulative distances
        for( int b = base; b <glob_j; b++)
        {
            diftot = 0;
            for( int m = 0; m < HISTLEN; m++)
            {
                difval = hist[b][m] - hist[glob_j][m];
                if( difval > 0)
                {
                    diftot += difval;
                }
                else
                {
                    diftot -= difval;
                }
            }
            // Calculate cumulative distance for newest
            // feature vector
            acc_dif[ glob_j] += diftot;
            // Update cumulative distance for the feature
            // vector in the set
            acc_dif[ b ] += diftot;
            // Keep track of minimum cumulative distance
            if( acc_dif[ b ] < pbest )
            {
                vm_index = b;
                pbest = acc_dif[ b ];
```

TABLE A-continued

```
            }
        }
        // Keep track of minimum cumulative distance
        if( acc_dif[ glob_j ] < pbest )
        {
            vm_index = glob_j;
        }
        // keep track of how many times the same
        // video frame has been selected consecutively by the
        // vector median filter.
        prev_count_vm = count_vm;
        if( vm_index == prev_vm_index )
        {
            count_vm++;
        }
        else
        {
            count_vm = 0;
        }
        // Calculate threshold value
        // frac_num is numerator and frac_deno is denoinator
        frac_num = seg_maxlen*(1+seg_thresh);
        frac_deno = seg_maxlen+(seg_thresh*seg_len);
        // Detect a segment boundary and issue a keyframe
// if minimum run length has been exceeded
            if( (prev_count_vm > min_runlen) && (count_vm == 0))
            {
                GetDecim(0,0,width,height,base,count_segs);
                store_lowseg[count_segs ] = base;
                store_hiseg[count_segs++] = glob_j-1;
                base = glob_j;
                seg_len = 0;
                prev_vm_index = base;
                acc_dif[base] = 0;
                keyframe_flag = true;
            }
            // Detect a segment boundary and issue a keyframe
// if cumulative distance
            // of newest feature vector is larger than the
            // thershold value multiplied by the minimum
            // cumulative distance of the set.
            else if( (frac_deno*acc_dif[glob_j]) >=
(frac_num*acc_dif[vm_index]) )
            {
                GetDecim(0,0,width,height,base,count_segs);
                store_lowseg[count_segs] = base;
                store_hiseg[count_segs++] = glob_j-1;
                base = glob_j;
                seg_len = 0;
                prev_vm_index = base;
                acc_dif[base] = 0;
                count_vm = 0;
                keyframe_flag = true;
            }
            // No segment boundary detected;
            else
            {
                seg_len++;
                keyframe_flag = false;
                prev_vm_index = vm_index;
            }
        // Prepare display of the keyframe
        // only MAX_KEYFRAMES are displayed
        // on the screen
        if( keyframe_flag == true)
        {
            if( ScanKeyFrames == MAX_KEYFRAMES)
            {
                // Place new keyframe at beginning
                KeyFrame_imgs[0] = createImage(
theKeyFrames[count_segs-1]);
                // and make other placeholders gray
                for( int imgindex = 1; imgindex < MAX_KEYFRAMES;
imgindex++)
                {
                    KeyFrame_imgs[imgindex] = theLightGrayImage;
                }
                ScanBase = count_segs-1;
                ScanKeyFrames = 1;
            }
```

TABLE A-continued

```
            else
            {
                // append new keyframe to display list
                KeyFrame_imgs[ScanKeyFrames++] = createImage(
theKeyFrames[count_segs-1]);
            }
        }
        // Take care of the last keyframe of the last segment
        // in the video sequence
        if( glob_j == img_count-1 )
        {
            if( keyframe_flag == false)
            {
                GetDecim(0,0,width,height,base,count_segs);
                store_lowseg[count_segs ] = base;
                store_hiseg[count_segs++] = glob_j;
                keyframe_flag = true;
            }
            else
            {
                GetDecim(0,0,width,height,glob_j,count_segs);
                store_lowseg[count_segs ] = glob_j;
                store_hiseg[count_segs++] = glob_j;
            }
            if( ScanKeyFrames == MAX_KEYFRAMES )
            {
                KeyFrame_imgs[0] = createImage(
theKeyFrames[count_segs-1]);
                for( int imgindex = 1; imgindex < MAX_KEYFRAMES;
imgindex++)
                {
                    KeyFrame_imgs[imgindex] = theLightGrayImage;
                }
                ScanKeyFrames = 1;
                ScanBase = count_segs-1;
            }
            else
            {
                KeyFrame_imgs[ScanKeyFrames++] = createImage(
theKeyFrames[count_segs-1]);
            }
        }
        return( keyframe_flag );
    }
    // Utility for loading images
    public boolean imageUpdate(Image img, int flags, int x, int y, int w, int h)
    {
        if( (flags & (ERROR | ABORT)) != 0 )
        {
            paint_flag = 1;
            str = "ERROR IN LOADING";
            xPos = 20;
            yPos = 10;
            repaint( );
        }
        if( imgs_all_loaded )
        {
            return false;
        }
        if( (flags & ALLBITS) == 0)
        {
            return true;
        }
        if( ++loaded_count == img_count )
        {
            imgs_all_loaded = true;
        }
        return false;
    }
    // Utility for computing an image histogram
    private void computeHistogram( int [ ] pixels, int w, int h, int n)
    {
        int pixval;
        int r;
        int g;
        int b;
        int lum;
        int scan_index = 0;
        for( int k = 0; k < HISTLEN; k++)
```

TABLE A-continued

```
            {
                hist[n][k] = 0;
            }
            for (int j=0; j<h; j++)
            {
                for (int i=0; i<w; i++)
                {
                    pixval = pixels[scan_index++];
                    r = (pixval >> 16) & 0xff;
                    g = (pixval >> 8) & 0xff;
                    b = (pixval    ) & 0xff;
                    lum = (int)((0.299*r)+(0.587*g)+(0.114*b));
                    hist[n][lum]++;
                }
            }
            return;
    }
    // Utility for down-sampling an image
    private void computeDecim( int [ ] pixels, int w, int h, int [ ] decim)
    {
            int scan_index = 0;
            int decim_index = 0;
            for (int j=0; j<h; j+=2)
            {
                for (int i=0; i<w; i+=2)
                {
                    decim[decim_index++] = pixels[scan_index];
                    scan_index += 2;
                }
                scan_index+=w;
            }
            return;
    }
    private void GetHist(int x, int y, int w, int h, int n)
    {
            int[ ] pixels = new int[w*h];
    PixelGrabber pg =
            new PixelGrabber(imgs[n], x, y, w, h, pixels, 0, w);
    try
            {
            pg.grabPixels( );
    }
            catch (InterruptedException e)
            {
            System.err.println("interrupted waiting for pixels!");
            return;
    }
    if ((pg.status( ) & ImageObserver.ABORT) != 0)
            {
                System.err.println("image fetch aborted or errored");
                return;
    }
            computeHistogram(pixels,w,h,n);
    }
    private void GetDecim(int x, int y, int w, int h, int n, int u)
    {
            int[ ] pixels = new int[w*h];
            int[ ] decim_pix = new int[(w*h)>>2];
    PixelGrabber pg =
            new PixelGrabber(imgs[n], x, y, w, h, pixels, 0, w);
    try
            {
            pg.grabPixels( );
    }
            catch (InterruptedException e)
            {
            System.err.println("interrupted waiting for pixels!");
            return;
    }
    if ((pg.status( ) & ImageObserver.ABORT) != 0)
            {
                System.err.println("image fetch aborted or errored");
                return;
    }
            computeDecim(pixels,w,h,decim_pix);
            theKeyFrames[u] = new
    MemoryImageSource(w>>1 ,h>>1 ,decim_pix,0,w>>1);
            return;
    }
```

TABLE A-continued

```
    private Image MakeLightGrayImage(int w, int h)
    {
        int[ ] pixels = new int[w*h];
        for (int j=0; j<(w*h); j++)
        {
            pixels[j] = 0xFFB8B8B8;
        }
        return( createImage( new MemoryImageSource(w,h,pixels,0,w)) );
    }
    public Image [ ] getImages( )
    {
        return( imgs);
    }
    public Image [ ] getKeyframes( )
    {
        return( KeyFrame_imgs );
    }
    public int getWidth( )
    {
        return( width );
    }
    public int getHeight( )
    {
        return( height );
    }
    public int getKeyframeCount( )
    {
        return( count_segs );
    }
    public int [ ] getSegmentLowBoundaries( )
    {
        return( store_lowseg );
    }
    public int [ ] getSegmentHighBoundaries( )
    {
        return( store_hiseg );
    }
    public boolean [ ] getShotBoundariesIndicator( )
    {
        return( flag_shot );
    }
    public int getDisplayedKeyframeIndexBase( )
    {
        return( ScanBase );
    }
    public int getSequenceLength( )
    {
        return( img_count );
    }
```

TABLE B

```
/***********************************************************************
************************/
/** On-line video summarization based on vector median filter **/
/** A second, coarser summary is also generated         **/
/** by applying the vector median filter to the keyframes    **/
/** belonging to a same shot                 **/
import java.awt.*;
import java.applet.*;
import java.net.*;
import java.awt.image.*;
public class vm_applet extends Applet implements Runnable
{
    static final int OX = 260;
    static final int OY = 0;
    static final int REFRESH = 0;
    static final int LOOP_WAIT = 4999;
    static final int down_off = 145;
    static final int left_off = 0-255;
    static final int HISTLEN = 256;
    static int xPos = 40;
    static int yPos = 40;
    String num_images;
    String [ ] msgs;
    static Image [ ] imgs;
```

TABLE B-continued

```
static Image [ ] proc_imgs;
int img_count = 0;
Graphics currg = null;
ImageObserver io;
static int paint_flag;
static String str;
static int load_index = 0;
int width;
int height;
static int loaded_count = 0;
static boolean imgs_all_loaded = false;
static int [ ] save_xPos;
static int [ ] save_yPos;
int [ ][ ] hist;
static int glob_j;
static int [ ] store_lowseg;
static int [ ] store_hiseg;
static int [ ] store_index;
static int [ ] acc_dif;
static int [ ] super_acc;
int vm_index;
int prev_vm_index;
int shiftx = 0;
int shifty = 0;
int count_segs = 0;
boolean keyframe_flag;
static boolean [ ] flag_shot;
int key_count;
static int pbest_init;
int super_base;
int count_supers;
static int [ ] super_vm_index;
int dic;
Thread t = null;
public void init( ){
    num_images = getParameter("ImageCount");
    img_count = Integer.valueOf(num_images).intValue( );
    msgs = new String[img_count] ;
    for( int k = 0; k < img_count; k++)
    {
        msgs[k] = getParameter("Image"+String.valueOf(k));
    }
    // Provision memory for various parameters
    Rectangle ctn = getParent( ).bounds( );
    setBackground(Color.lightGray);
    resize(ctn.width, ctn.height);
    currg = getGraphics( );
    imgs = new Image[img_count];
    proc_imgs = new Image[img_count];
    save_xPos = new int[img_count];
    save_yPos = new int[img_count];
    hist = new int[img_count][ ];
    store_lowseg = new int[img_count];
    store_hiseg = new int[ img_count];
    acc_dif = new int[ img_count ];
    super_acc = new int[ img_count ];
    super_vm_index = new int[ img_count ];
    store_index = new int[img_count];
    flag_shot = new boolean [img_count];
    for( int k = 0; k < img_count; k++)
    {
        hist[k] = new int[HISTLEN];
    }
    // 256 entries in histogram
    // 256 is max sample value difference
    pbest_init = img_count * HISTLEN * 256;
}
// Utilities for displaying images and text on screen
// Text (frame number associated with keyframe) is
// in a yellow box if it is a regular keyframe
// Text is in a green box if keyframe is also first
// keyframe of a video shot
// Image is surrounded by a blue frame is keyframe is
// also keyframe at coarse summary level.
public void paint(Graphics g)
{
    if( currg == null)
    {
        currg =g;
```

TABLE B-continued

```
        }
        g.setColor(Color.red);
        g.setFont( new Font("Arial", Font.BOLD, 11) );
        switch( paint_flag )
        {
            case 0:
                g.drawString(null,0,0);
                break;
            case 1:
                g.drawString(str,xPos,yPos );
                break;
            case 2
                io = null,
                for( int idx = 0; idx <= load_index; idx++)
                {
g.drawImage(imgs[idx] save_xPos[idx] ,save_yPos[idx],Color.black,io);
g.drawString(msgs[idx],save_xPos[idx],save_yPos[idx]+120);
                }
                load_index += 1
                break;
            case 3:
                io = null;
                break;
            case 4:
            io = null;
            break;
            case 5:
                io = null;
                g.drawImage(imgs[glob_j] ,xPos,yPos,Color.black,io);
                g.setColor(Color.yellow);
                g.fillRect(xPos,yPos+height,width, 15);
                g.setColor(Color.red);
                g.drawString(msgs[glob_j] ,xPos,yPos+height+10);
                break;
            case 6:
                io = null;
                shiftx = 0;
                shifty = 0;
                key_count = 0;
                int ss = 0;
                for( int kf = 0; kf < count_segs; kf++)
                {
g.drawImage(proc_imgs[kf],xPos+left_off+shiftx,yPos+shifty+down_off,Color.black,
io);
                    str = "#" + String.valueOf( store_index[kf] );
                    str += "of [";
                    str += String.valueOf(store_lowseg[kf]);
                    str += ";";
                    str += String.valueOf(store_hiseg[kf]);
                    str += "]";
                    if( flag_shot[kf] == true )
                    {
                        g.setColor(Color.green);
                    }
                    else
                    {
                        g.setColor(Color.yellow);
                    }
g.fillRect(xPos+left_off+shiftx,yPos+down_off+shifty+(height>>1 ),(width>>1), 15);
                    g.setColor(Color.red);
g.drawString(str,xPos+left_off+shiftx,yPos+shifty+down_off+(height>>1)+10);
                    if( (ss < count_supers) && (kf ==
super_vm_index[ss]) )
                    {
                        g.setColor(Color.blue);
g.fillRect(xPos+left_off+shiftx,yPos+down_off+15+shifty+(height>>1),(width>>1),2);
g.fillRect(xPos+left_off+shiftx,yPos+down_off+shifty-2,(width>>1),2);
g.fillRect(xPos+left_off+shiftx-2 ,yPos+down_off+shifty-2,2,(height>>1)+15+4);
g.fillRect(xPos+left_off+shiftx+(width>>1),yPos+down_off+shifty-2,2,(height>>1 )+
15+4);
                        ss++;
                    }
                    shiftx += (width >> 1)+10;
                    if( ++key_count >= 7 )
                    {
                        key_count = 0;
                        shiftx = 0;
                        shifty += ((height>>1)+25);
                    }
```

TABLE B-continued

```
            }
            break;
        default:
        }
    }
    public void start( )
    {
        if( t == null )
        {
            t = new Thread(this);
            t.start( );
        }
    }
    public void run( )
    {
        int diftot;
        int difval;
        int base;
        double mu ;
        double sigma;
        int counter ;
        double alpha = 4.0;
        double minShotLength = 10;
        double currentMean;
        int prev;
        double threshold;
        int pbest;
        intcount_vm;
        int prev_count_vm;
        // Maximum segment length
        // At least one keyframe will be generated
        // for that many input video frames
        int seg_maxlen = 45;
        // Initial value for calculating time-varying
        // threshold.
        int seg_thresh = 17;
        // Minimum number of times the same frame
        // must be consecutively selected by
        // median filter to become a keyframe
        int min_runlen = 7;
        intseg_len;
        double frac_num;
        double frac_deno;
        int super_pbest;
        int index;
        // get references to images from HTML document
        // publishing this applet
        paint_flag = 1;
        for( int k =0; k < img_count; k++)
        {
            try
            {
                imgs[k] = Toolkit.getDefaultToolkit( ).getImage( new URL(
getDocumentBase( ), msgs[k] ));
                str = "Getting Reference to image";
                str += String.valueOf(k);
                repaint( );
                // Thread.currentThread( ).sleep(100);
            }
            catch( Exception e )
            {
            }
        }
        paint_flag = 0;
        repaint( );
        for( int k = 0; k < img_count; k++)
        {
            io = this;
            currg.drawImage(imgs[k] ,-1000,-1000,Color.black,io);
            try
            {
                Thread.sleep( 100 );
            }
            catch( Exception e )
            {
            }
        }
        while( !imgs_all_loaded )
        {
```

TABLE B-continued

```
            try
            {
                str = "Loading images . . . ";
                paint_flag = 1;
                xPos = 40;
                yPos = 40;
                repaint( );
                // Thread.sleep(10);
            }
            catch( Exception e)
            {
            }
        }
        while( true )
        {
            try
            {
                str = "7.4925 Hz Progressive 180x120 Video";
                paint_flag = 1;
                xPos = OX + 220;
                yPos = OY + 80;
                repaint( );
                // Thread.sleep(2000);
            }
            catch( Exception e )
            {
            }
            for( int k = 0; k < img_count; k++)
            {
                acc_dif[k] = 0;
                store_index[k] = 0;
                flag_shot[k] = false;
            }
            mu = 0.0;
            sigma = 0.0;
            counter = 1;
            prev = 0;
            prev_count_vm = 0;
            count_vm = 0;
            count_segs = 0;
            seg_len = 0;
            vm_index = 0;
            super_base = 0;
            count_supers = 0;
            // Start video summarization
            base = 0;
            for( glob_j = 0; glob_j < img_count; glob_j++)
            {
                try
                {
                    width = 0;
                    while( (width = imgs[glob_j].getWidth(null)) == 0)
                    {
                        // Thread.sleep(1);
                    }
                    height = 0;
                    while( (height = imgs[glob_j].getHeight(null)) == 0)
                    {
                        // Thread.sleep(1);
                    }
                    // Compute video frame histogram
                    GetHist(0,0,width,height,glob_j);
                    // Initialization for coarse summary
                            if( glob_j == 0 )
                    {
                        xPos = OX;
                        yPos = OY;
                        paint_flag = 5;
                        paint(currg);
                        Thread.sleep( REFRESH );
                        prev_vm_index = 0;
                        flag_shot[0] = true;
                        super_base = 0;
                        count_supers = 0;
                        for( int z = 0; z < img_count; z++)
                        {
                            super_acc[z] = 0;
                        }
                        continue;
```

TABLE B-continued

```
            }
            // For shot boundary detection
            diftot = 0;
            for( int m = 0; m < HISTLEN; m++)
            {
                    difval = hist[glob_j] [m] - hist[glob_j-1][m];
                    if( difval > 0 )
                    {
                            diftot += difval;
                    }
                    else
                    {
                            diftot -= difval;
                    }
            }
            mu += diftot;
            sigma += (diftot * diftot);
            currentMean = mu / (double) counter;
            threshold = currentMean;
            if( counter > 1 )
            {
                    threshold += (alpha * Math.sqrt( (sigma -
((double)counter*currentMean*currentMean)) / (double)(counter-1) ));
            }
            // Shot boundary has been detected if
            // following test is true
            if( (diftot > threshold) && (glob_j-prev >
minShotLength) )
            {
                    prev = glob_j;
                    mu = 0.0;
                    sigma = 0.0;
                    counter = 0;
                    flag_shot[count_segs+1] = true;
        GetDecim(0,0,width,height,prev_vm_index,count_segs);
                    store_lowseg[count_segs ] = base;
                    store_hiseg[count_segs] = glob_j-1;
                    store_index[count_segs] = prev_vm_index;
                    base = glob_j;
                    seg_len = 0;
                    prev_vm_index = base;
                    acc_dif[base] = 0;
                    count_vm = 0;
                    // dic = 1;
                    keyframe_flag = true;
            // Since shot boundary has been found,
            // it is time to calculate most representative
            // keyframe of all keyframes in the same shot
            // The resulting keyframe is the keyframe
            // that will appear in the coarser summary
            // (one keyframe per video shot)
            // The vector median filter is applied to
            // all keyframes in the shot.
                    // First calculate cumulative distances
                    for( int z = super_base; z < count_segs;
z++)
                    {
                            index = store_index[z];
                            diftot = 0;
                            for( int m = 0; m < HISTLEN; m++)
                            {
                                    difval = hist[index][m] -
hist[prev_vm_index][m];
                                    if( difval > 0 )
                                    {
                                            diftot += difval;
                                    }
                                    else
                                    {
                                            diftot -= difval;
                                    }
                            }
                            super_acc[ count_segs ] += diftot;
                            super_acc[ z ] += diftot;
                    }
                    // Then identify minimum cumulative
distance
                    super_pbest = pbest_init;
                    for( int z = super_base, z <= count_segs;
```

TABLE B-continued

```
z++)
                {
                    if( super_acc[ z] < super_pbest )
super_vm_index[count_supers] = z;
                        super_pbest = super_acc[ z ];
                    }
                }
                super_base = count_segs;
                count_supers++;
                count_segs++
            }
            else
            {
                // No shot boundary has been detected
                counter++;
                // calculate output of vector median
                // filter for current segment
                acc_dif[ glob_j] = 0;
                pbest = pbest_init;
                for( int b = base; b < glob_j; b++)
                {
                    diftot = 0;
                    for( int m = 0; m < HISTLEN; m++)
                    {
                        difval = hist[b][m] -
hist[glob_j][m];
                        if( difval > 0 )
                        {
                            diftot += difval;
                        }
                        else
                        {
                            diftot -= difval;
                        }
                    }
                // Update cumulative distances
                    acc_dif[ glob_j ] += diftot;
                    acc_dif[ b ] += diftot;
                // Keep track of minimal cumulative distance
                    if( acc_dif[ b ] < pbest )
                    {
                        vm_index = b;
                        pbest = acc_dif[ b ];
                    }
                }
                // Keep track of minimum cumulative
distance
                if( acc_dif[ glob_j ] < pbest )
                {
                    vm_index = glob_j;
                }
                // Keep track of number of times
                // same keyframe has been selected
                // consecutively
                prev_count_vm = count_vm;
                if( vm_index == prev_vm_index )
                {
                    count_vm++;
                }
                else
                {
                    count_vm = 0;
                }
                // Calculate threshold numerator and
                // denominator
                frac_num = seg_maxlen*(1.0+seg_thresh);
                frac_deno =
seg_maxlen+(seg_thresh*seg_len);
                if( (prev_count_vm > min_runlen) &&
(count_vm == 0))
                {
                    // Issue new keyframe as minimum
                    // run length for vector median output
                    // has been satisfied
GetDecim(0,0,width,height,prev_vm_index,count_segs);
                    store_lowseg[count_segs ] = base;
                    store_hiseg[count_segs] = glob_j-1;
                    store_index[count_segs] =
prev_vm_index;
```

TABLE B-continued

```
                            base = glob_j;
                            seg_len = 0;
                            prev_vm_index = base;
                            acc_dif[base] = 0;
                            keyframe_flag = true;
                            // Update cumulative distances
                            // among keyframes of the current
                            // shot (for coarse summary)
                            for( int z = super_base; z <
count_segs; z++)
                            {
                                index = store_index[z];
                                diftot = 0;
                                for(int m = 0; m < HISTLEN;
m++)
                                {
                                    difval = hist[index][m] -
hist[prev_vm_index][m];
                                    if( difval > 0 )
                                    {
                                        diftot += difval;
                                    }
                                    else
                                    {
                                        diftot -= difval;
                                    }
                                }
                                super_acc[ count_segs ] +=
diftot;
                                super_acc[ z ] += diftot;
                            }
                            count_segs++;
                        }
                        else if( (frac_deno*acc_dif[glob_j]) >=
(frac_num*acc_dif[vm_index]) )
                        {
                            // Cumulative distance is greater
                            // than threshold multiplied by
                            // minimal cumlative distance:
                            // Time to generate a keyframe
GetDecim(0,0,width,height,prev_vm_index,count_segs);
                            store_lowseg[count_segs ] = base;
                            store_hiseg[count_segs] = glob_j-1;
                            store_index[count_segs] =
prev_vm_index;
                            base = glob_j;
                            seg_len = 0;
                            prev_vm_index = base;
                            acc_dif[base] = 0;
                            count_vm = 0;
                            keyframe_flag = true;
                            // Update cumulative distance
                            // among keyrames of current
                            // shot (for coarse summary)
                            for( int z = super_base; z <
count_segs; z++)
                            {
                                index = store_index[z];
                                diftot = 0;
                                for( int m = 0; m < HISTLEN;
m++)
                                {
                                    difval = hist[index][m] -
hist[prev_vm_index][m];
                                    if( difval > 0 )
                                    {
                                        diftot += difval;
                                    }
                                    else
                                    {
                                        diftot -= difval;
                                    }
                                }
                                super_acc[ count_segs ] +=
diftot;
                                super_acc[ z ] += diftot;
                            }
                            count_segs++;
                        }
```

TABLE B-continued

```
                else
                {
                    // No keyframe is generated
                    seg_len++;
                    keyframe_flag = false;
                    prev_vm_index = vm_index;
                    Thread.sleep(100);
                }
            }
            xPos = OX;
            yPos = OY;
            paint_flag = 5;
            paint(currg);
            if( keyframe_flag == true)
            {
                paint_flag =6;
                paint(currg);
            }
            Thread.sleep( REFRESH );
        }
        catch( Exception e )
        {
        }
    }
}
// Take care of last segment in video sequence
if( keyframe_flag == false )
{
    GetDecim(0,0,width,height,vm_index, count_segs);
    store_lowseg[count_segs ] = base;
    store_hiseg[count_segs] = glob_j-1;
    store_index[count_segs] = vm_index;
}
else
{
    GetDecim(0,0,width,height,glob_j-1,count_segs);
    store_lowseg[count_segs ] = glob_j-1;
    store_hiseg[count_segs] = glob_j-1;
    store_index[count_segs] = glob_j-1;
}
// Take care of coarse summary for last shot
// in the video sequence
for( int z = super_base; z < count_segs; z++)
{
    index = store_index[z];
    diftot = 0;
    for( int m = 0; m < HISTLEN; m++)
    {
        difval = hist[index][m] - hist[vm_index][m];
        if( difval > 0 )
        {
            diftot += difval;
        }
        else
        {
            diftot -= difval;
        }
    }
    super_acc[ count_segs ] += diftot;
    super_acc[ z ] += diftot;
}
super_pbest = pbest_init;
for( int z = super_base; z <= count_segs; z++)
{
    if( super_acc[ z ] < super_pbest )
    {
        super_vm_index[count_supers] = z;
        super_pbest = super_acc[ z ];
    }
}
count_supers++;
count_segs++;
try
{
    xPos = OX;
    yPos = OY;
    paint_flag = 6;
    paint(currg);
    Thread.sleep( LOOP_WAIT);
}
```

TABLE B-continued

```
            catch( Exception e)
            {
            }
            try
            {
                    paint_flag = 0;
                    paint( currg );
                    // Thread.sleep( 10 );
            }
            catch( Exception e )
            {
            }
        }
}
// Utility for loading the images
public boolean imageUpdate(Image img, int flags, int x, int y, int w, int h)
{
        if( (flags & (ERROR | ABORT)) != 0)
        {
            paint_flag = 1;
            str = "ERROR IN LOADING";
            xPos = 20;
            yPos = 10;
            repaint( );
        }
        if( imgs_all_loaded )
        {
            return false;
        }
        if( (flags & ALLBITS) == 0 )
        {
            return true;
        }
        if( ++loaded_count == img_count )
        {
            imgs_all_loaded = true;
        }
        return false;
}
// Utility for computing an image histogram
public void computeHistogram( int [ ] pixels, int w, int h, int n)
{
        int pixval;
        int r;
        int g;
        int b;
        int lum;
        int scan_index = 0;
        for( int k = 0; k < HISTLEN; k++)
        {
            hist[n][k] = 0;
        }
        for (int j=0; j<h; j++)
        {
            for (int i=0; i<w; i++)
            {
                // pixval = pixels[(j*w)+i];
                pixval = pixels[scan_index++];
                r = (pixval >> 16) & 0xff;
                g = (pixval >> 8) & 0xff;
                b = (pixval    ) & 0xff;
                lum = (int)((0.299*r)+(0.587*g)+(0.114*b));
                hist[n][lum]++;
            }
        }
        return;
}
// Utility to compute a down-sampled version of
// an image. This is used to display the keyframes
// on the screen.
public void computeDecim( int [ ] pixels, int w, int h, int [ ] decim)
{
        int scan_index = 0;
        int decim_index = 0;
        for (int j=0; j<h; j+=2)
        {
            for (int i=0; i<w; i+=2)
            {
                decim[decim_index++] = pixels[scan_index];
```

TABLE B-continued

```
            scan_index += 2;
        }
        scan_index += w;
    }
    return;
}
public void GetHist(int x, int y, int w, int h, int n)
{
    int[ ] pixels = new int[w*h];
    PixelGrabber pg =
        new PixelGrabber(imgs[n], x, y, w h, pixels, 0, w);
    try
    {
        pg.grabPixels( );
    }
    catch (InterruptedException e)
    {
        System.err.println("interrupted waiting for pixels!");
        return;
    }
    if ((pg.status( ) & ImageObserver.ABORT) != 0)
    {
        System.err.println("image fetch aborted or errored");
        return;
    }
    computeHistogram(pixels,w,h,n);
}
public void GetDecim(int x, int y, int w, int h, int n, int u)
{
    int[ ] pixels = new int[w*h];
    int[ ] decim_pix = new int[(w*h)>>2];
    PixelGrabber pg =
        new PixelGrabber(imgs[n], x, y, w, h, pixels, 0, w);
    try
    {
        pg.grabPixels( );
    }
    catch (InterruptedException e)
    {
        System.err.println("interrupted waiting for pixels!");
        return;
    }
    if ((pg.status( ) & ImageObserver.ABORT) != 0)
    {
        System.err.println("image fetch aborted or errored");
        return;
    }
    computeDecim(pixels,w,h,decim_pix);
    proc_imgs[u] = createImage(new
MemoryImageSource(w>>1 ,h>>1,decim_pix,0,w>>1));
}
public boolean mouseDown(Event evt, int x, int y)
{
    if( load_index < img_count )
    {
        save_xPos[load_index] = x;
        save_yPos[load_index] = y;
        paint_flag = 2;
        repaint( );
    }
    else
    {
        paint_flag = 2;
        load_index = img_count−1;
        repaint( );
    }
    return true;
}
}
```

What is claimed is:

1. A method of identifying a key video frame within a plurality of video frames comprising the steps of:

(a) dividing said plurality of video frames into at least two segments;

(b) characterizing said plurality of video frames as a plurality of feature vectors;

(c) identifying for each of at least two segments a first level key feature vector that minimizes a distortion of said feature vectors included in said segment;

(d) identifying a second level key feature vector that minimizes distortion of a set of first level key feature vectors; and (e) identifying a video frame corresponding to said second level key feature vector as said key video frame.

2. The method of claim 1 wherein said first level key feature vector that minimizes said distortion of said plurality of feature vectors is identified by a vector rank filter.

3. The method of claim 1 wherein said second level key feature vector that minimizes said distortion of said set of first level key feature vectors is identified by a vector rank filter.

4. The method of claim 1 wherein at least one feature vector of said plurality of feature vectors is a vector signal describing an image histogram.

5. The method of claim 1 wherein at least one feature vector of said plurality of feature vectors is a vector signal describing an ordered set of image samples.

6. The method of claim 1 wherein at least one feature vector of said plurality of feature vectors is a vector signal which includes a component describing luminance of said video frame.

7. The method of claim 1 wherein at least one feature vector of said plurality of feature vectors is a vector signal which includes a component describing the average intensity of said video frame.

8. A method of identifying a key video frame within a plurality of video frames comprising the steps of:
   (a) dividing said plurality of video frames into at least two segments;
   (b) characterizing said plurality of video frames as a plurality of feature vectors;
   (c) identifying for each of at least two segments a first level key feature vector that minimizes a distortion of said feature vectors included in said segment;
   (d) accumulating a set of said first level key feature vectors corresponding to said segments occurring in a predetermined period;
   (e) identifying a second level key feature vector that minimizes distortion of said set of first level key feature vectors; and
   (f) identifying a video frame corresponding to said second level key feature vector as said key video frame.

9. A method of summarizing of a plurality of video frames comprising the steps of:
   (a) dividing said plurality of video frames into at least two segments, each segment comprising at least one video frame;
   (b) defining a feature vector representative of each of said video frames;
   (c) identifying as a key feature vector a feature vector that minimizes a distortion of said feature vectors included in said segment;
   (d) ranking a saliency of a key feature vector relative to other key feature vectors;
   (f) selecting a video frame for said summary on a basis of said saliency ranking of a corresponding a key feature vector.

10. The method of claim 9 wherein said saliency is a function of a distortion of a set of key feature vectors produced by a feature vector included in said set.

11. The method of claim 9 wherein said saliency is a function of a distortion of a set of key feature vectors produced by a feature vector included in said set and a number of video frames included in said segment represented by said key feature vector.

* * * * *